(12) United States Patent
Bryant et al.

(10) Patent No.: US 11,524,297 B2
(45) Date of Patent: Dec. 13, 2022

(54) METHOD OF CONCENTRATING PARTICLES IN A LIQUID DROPLET USING AN EWOD DEVICE WITH SENSING APPARATUS

(71) Applicant: Sharp Life Science (EU) Limited, Oxford (GB)

(72) Inventors: Simon M. Bryant, Oxford (GB); Benjamin J. Hadwen, Oxford (GB); Christopher J. Brown, Oxford (GB); Sally Anderson, Oxford (GB)

(73) Assignee: Sharp Life Science (EU) Limited, Uxbridge (GB)

( * ) Notice: Subject to any disclaimer, the term of this patent is extended or adjusted under 35 U.S.C. 154(b) by 470 days.

(21) Appl. No.: 16/701,885

(22) Filed: Dec. 3, 2019

(65) Prior Publication Data
US 2021/0162417 A1    Jun. 3, 2021

(51) Int. Cl.
*B01L 3/00* (2006.01)
*G02B 21/32* (2006.01)
*G02B 21/33* (2006.01)

(52) U.S. Cl.
CPC ... *B01L 3/502792* (2013.01); *B01L 3/502715* (2013.01); *G02B 21/32* (2013.01);
(Continued)

(58) Field of Classification Search
CPC ......... B01L 3/502792; B01L 3/502715; B01L 2300/06; B01L 2300/0645;
(Continued)

(56) References Cited

U.S. PATENT DOCUMENTS 6,565,727 B1    5/2003  Shenderov
6,911,132 B2    6/2005  Pamula et al.
(Continued)

FOREIGN PATENT DOCUMENTS

CN    102671722        9/2012
CN    108291884 A      7/2018
(Continued)

OTHER PUBLICATIONS

Fan et al. (SK Fan, PW Huang, TT Wang, YH Peng, Cross-scale electric manipulations of cells and droplets by frequency-modulated dielectrophoresis and electrowetting, Lab Chip 8 (2008) 1325-1331). (Year: 2008).*
(Continued)

*Primary Examiner* — Joshua L Allen
(74) *Attorney, Agent, or Firm* — Renner, Otto, Boisselle & Sklar, LLP

(57) ABSTRACT

A microfluidic system and related methods of operating an electrowetting on dielectric (EWOD) device operate to concentrate particles within a liquid droplet dispensed onto an element array of the EWOD device. The method includes the steps of providing a non-polar liquid onto the element array of the EWOD device; providing a polar liquid droplet onto the element array of the EWOD device within the non-polar liquid, wherein the polar liquid droplet includes particles; and applying an actuation cycle comprising a plurality of actuation patterns, wherein at least one of the actuation patterns includes actuating one or more array element electrodes within a perimeter of the polar liquid droplet, and the particles migrate within the polar liquid droplet to become concentrated within a portion of the liquid droplet at one or more array element electrodes corresponding to one of the plurality of actuation patterns.

25 Claims, 23 Drawing Sheets

(52) U.S. Cl.
CPC .......... *G02B 21/33* (2013.01); *B01L 2300/06* (2013.01); *B01L 2300/0645* (2013.01); *B01L 2400/0427* (2013.01); *G02B 2207/115* (2013.01)

(58) Field of Classification Search
CPC ..... B01L 2400/0427; B01L 2200/0668; B01L 2200/0673; B01L 2300/0816; B01L 2400/0424; B01L 3/502761; B01L 3/50273; G02B 2207/115
See application file for complete search history.

(56) References Cited

U.S. PATENT DOCUMENTS

| | | | |
|---|---|---|---|
| 7,163,612 | B2 | 1/2007 | Sterling et al. |
| 8,173,000 | B1* | 5/2012 | Hadwen ............... G02B 26/005 204/600 |
| 10,078,986 | B2 | 9/2018 | Hadwen |
| 2003/0164295 | A1* | 9/2003 | Sterling .............. B01L 3/50273 204/600 |
| 2013/0062205 | A1* | 3/2013 | Hadwen ............ B01L 3/502784 204/601 |
| 2014/0194305 | A1 | 6/2014 | Kayyem et al. |
| 2015/0008128 | A1* | 1/2015 | Pamula ................... B03C 5/005 204/553 |
| 2016/0305906 | A1* | 10/2016 | Amos ....................... B01L 7/52 |
| 2018/0104695 | A1* | 4/2018 | Walton ............. B01L 3/502792 |
| 2020/0316606 | A1* | 10/2020 | Soto-Moreno .... B01L 3/502792 |

FOREIGN PATENT DOCUMENTS

| | | | |
|---|---|---|---|
| EP | 2570188 | 3/2013 | |
| WO | 2014036915 | 3/2014 | |
| WO | WO-2014036915 A1 * | 3/2014 | ........ B01L 3/502792 |
| WO | 2019227013 | 11/2019 | |

OTHER PUBLICATIONS

R. B. Fair, Microfluid Nanofluid (2007) 3:245-281.
Schertzer (Sensors and Actuators B 145 (2010) 340-347).
Hughes (Biomicrofluidics 10, 032801 (2016).
Frequency-Based Relationship of Electrowetting and Dielectrophoretic Liquid Microactuation, Langmuir 2003, 19, 7646-7651.
Clausius-Mossotti factor. Fan et al. (Lab Chip, 2008, 8, 1325-1331).
Kleinert et al. (Biomicrofluidics 9, 034104 (2015).

* cited by examiner

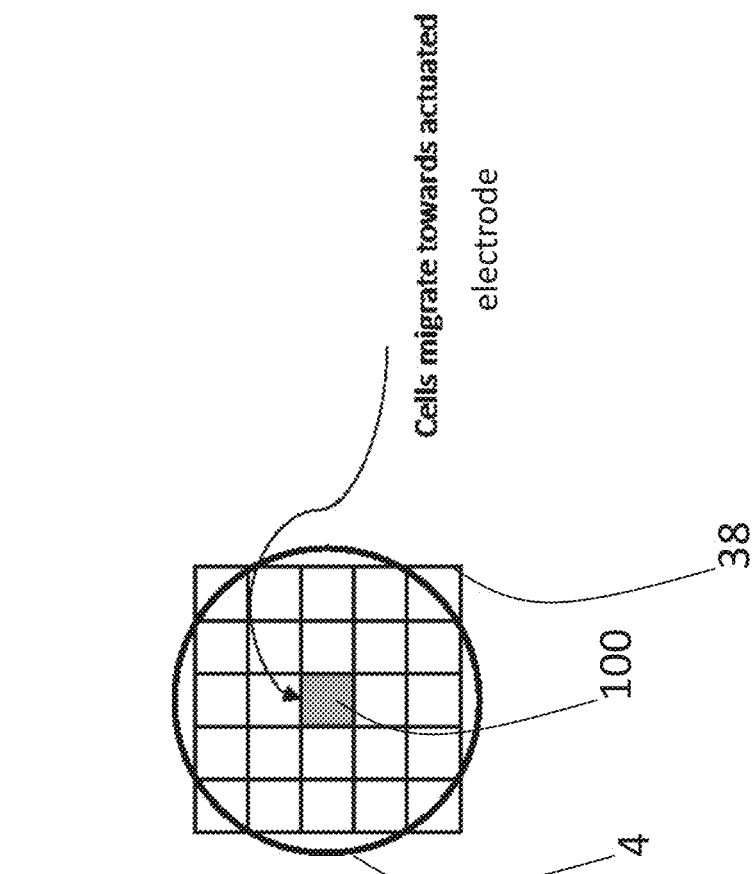
Fig. 4A
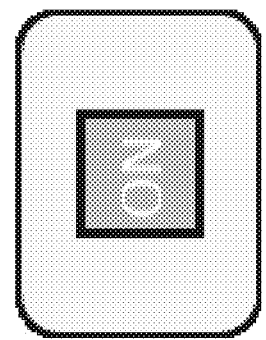

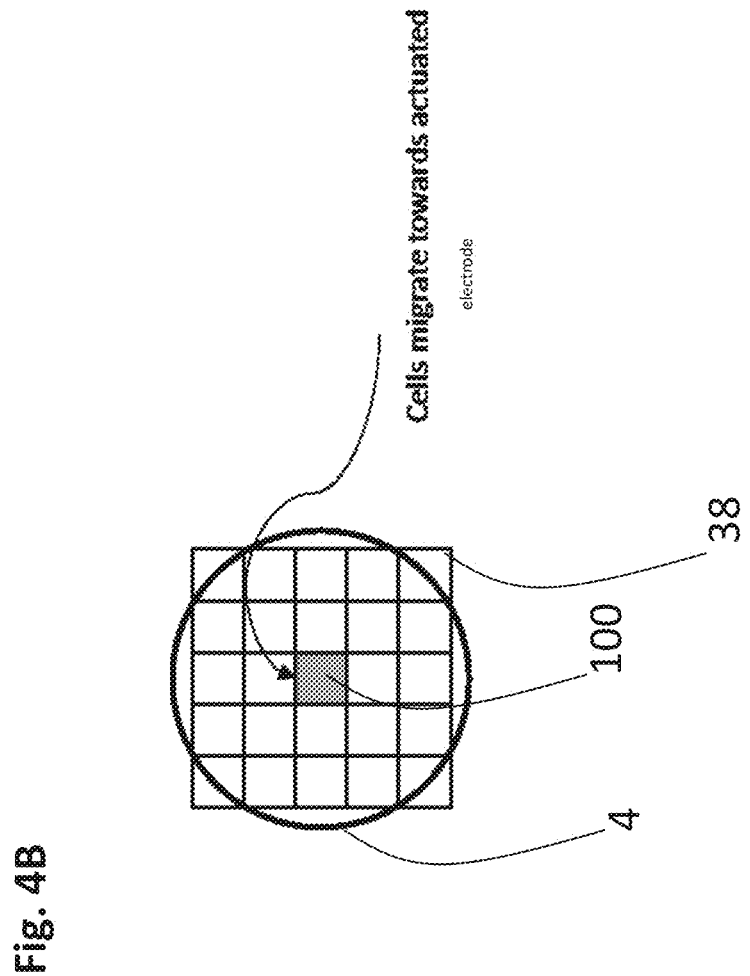
Fig. 4B
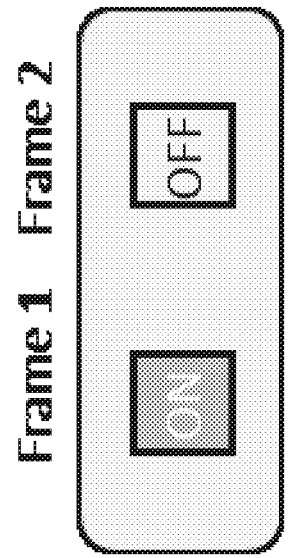

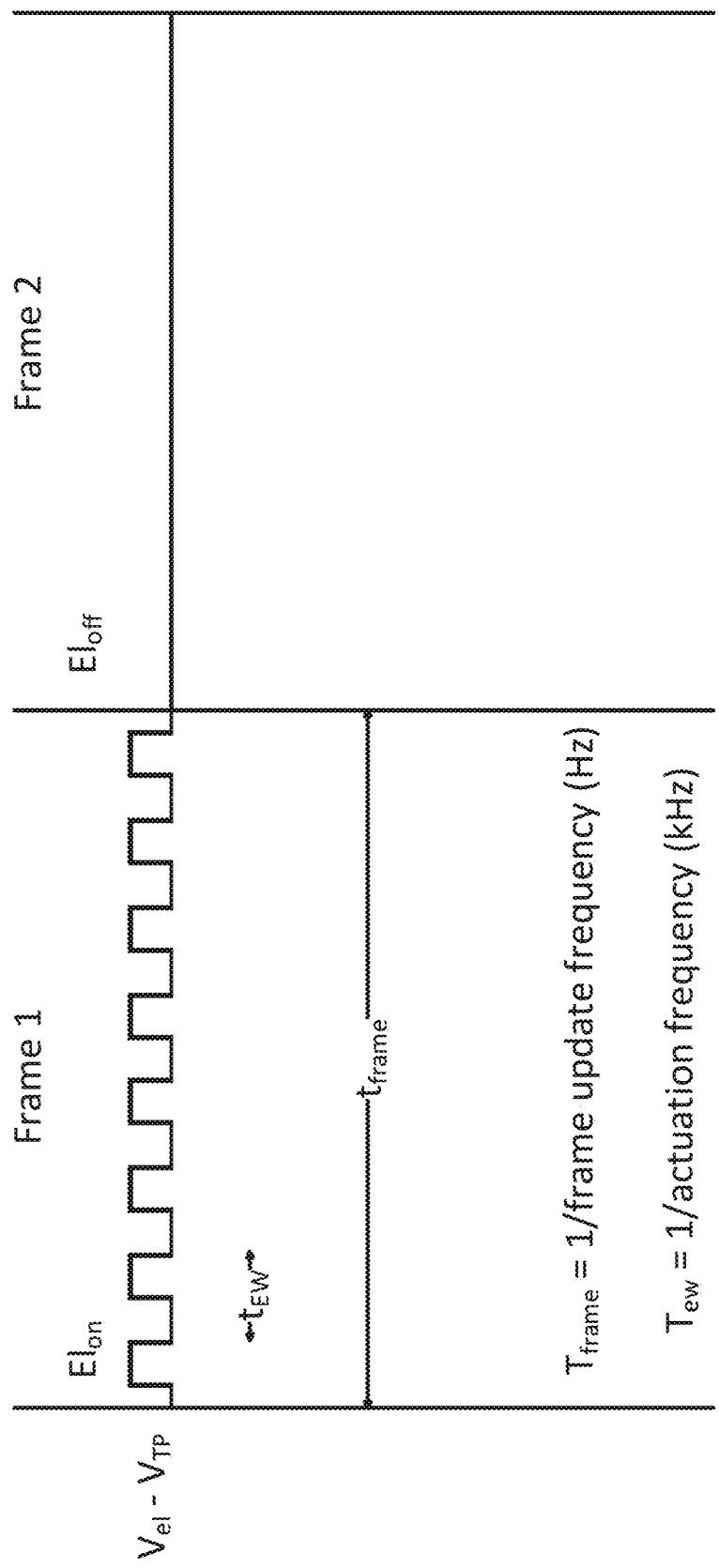

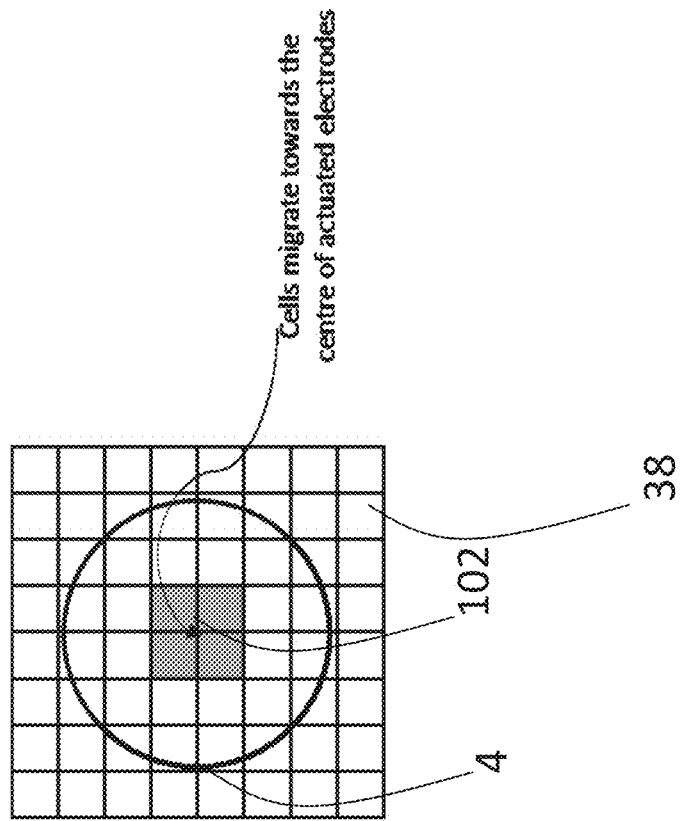
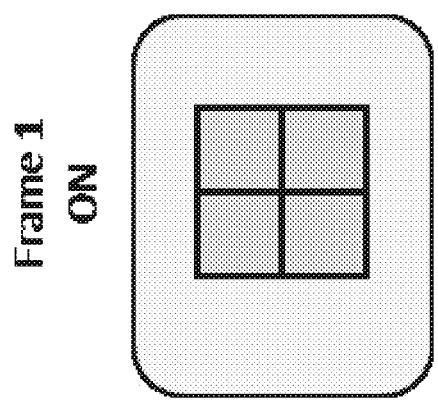
Fig. 5A

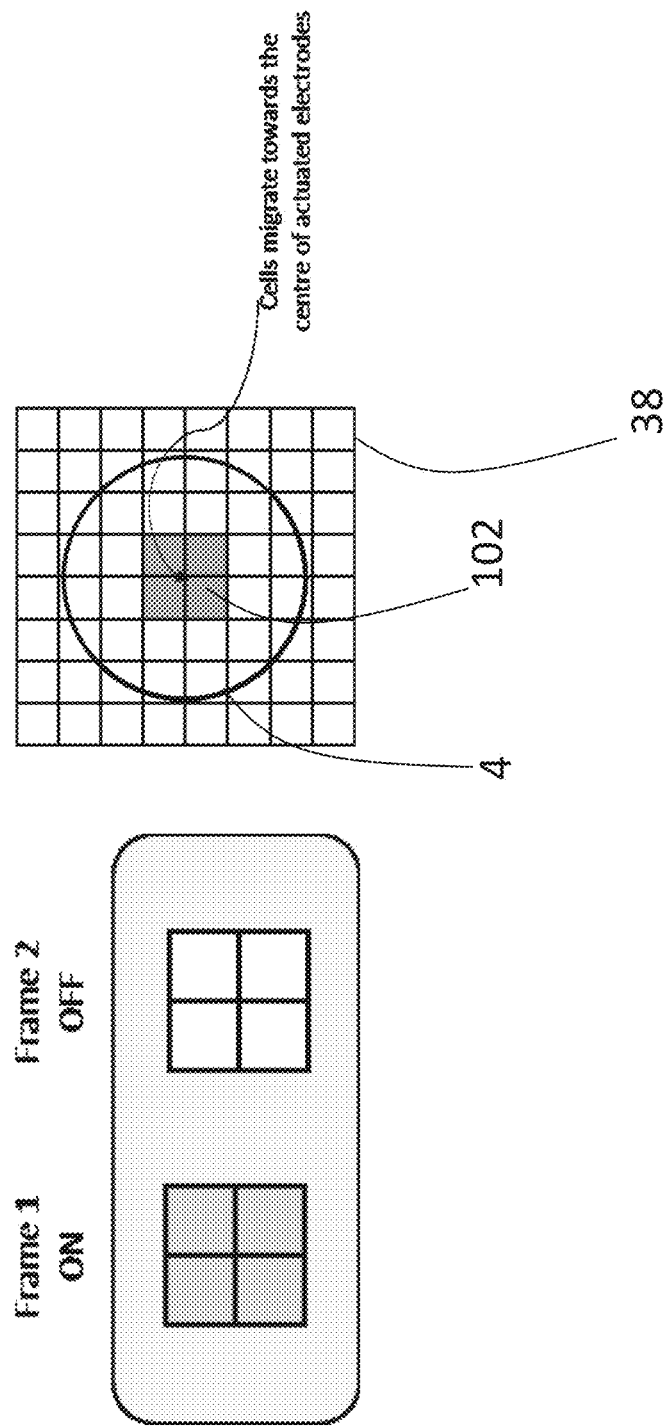

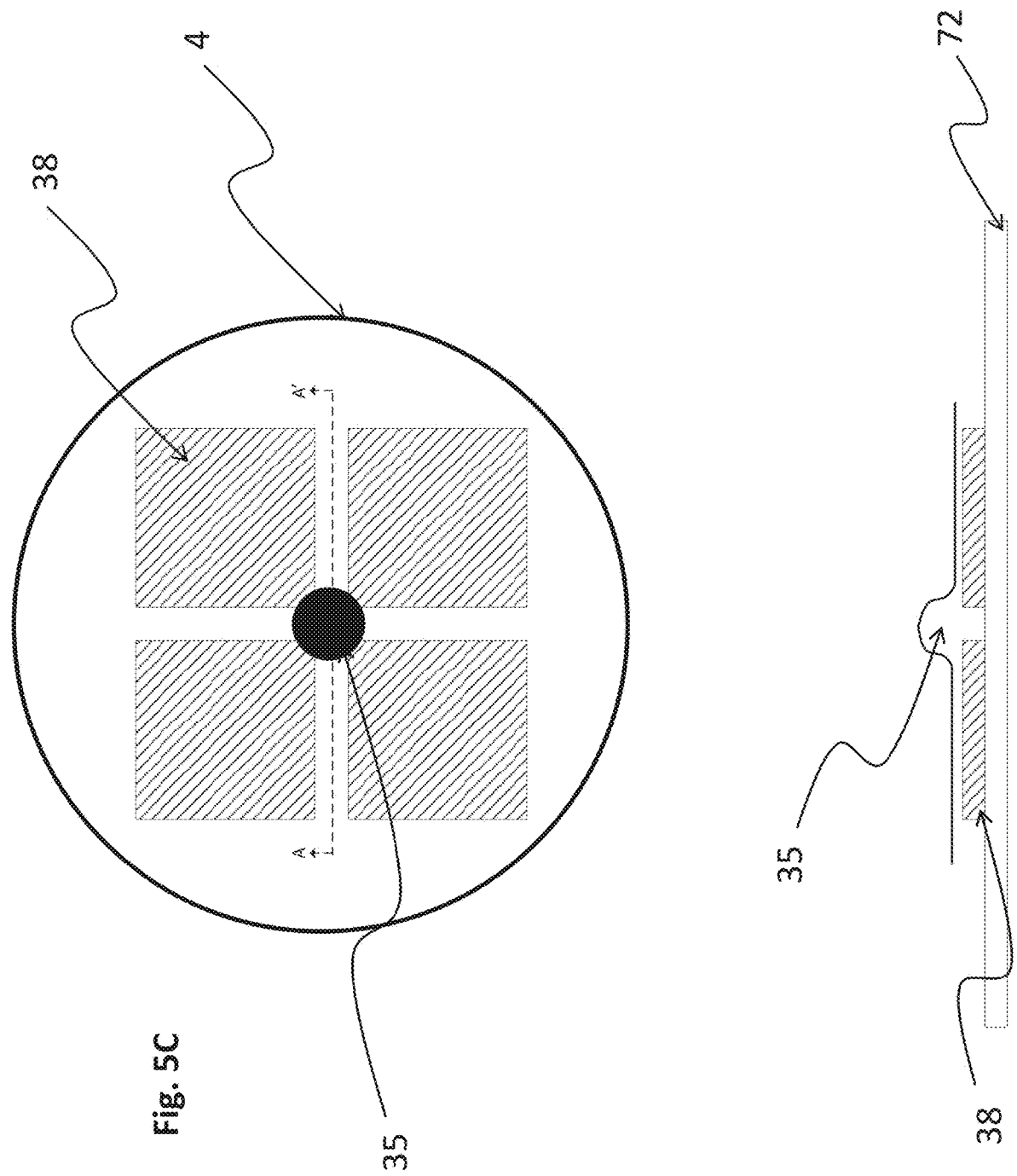

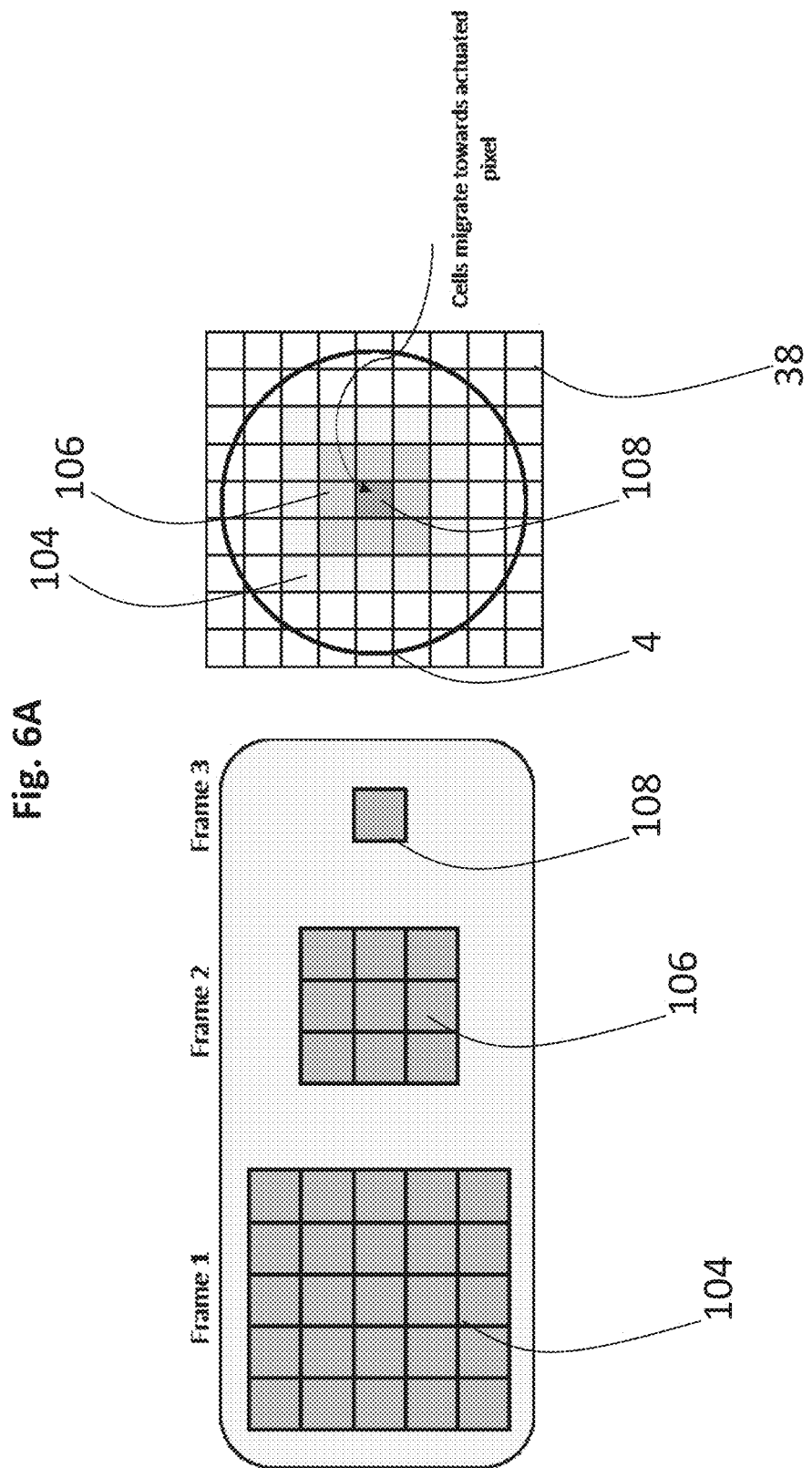

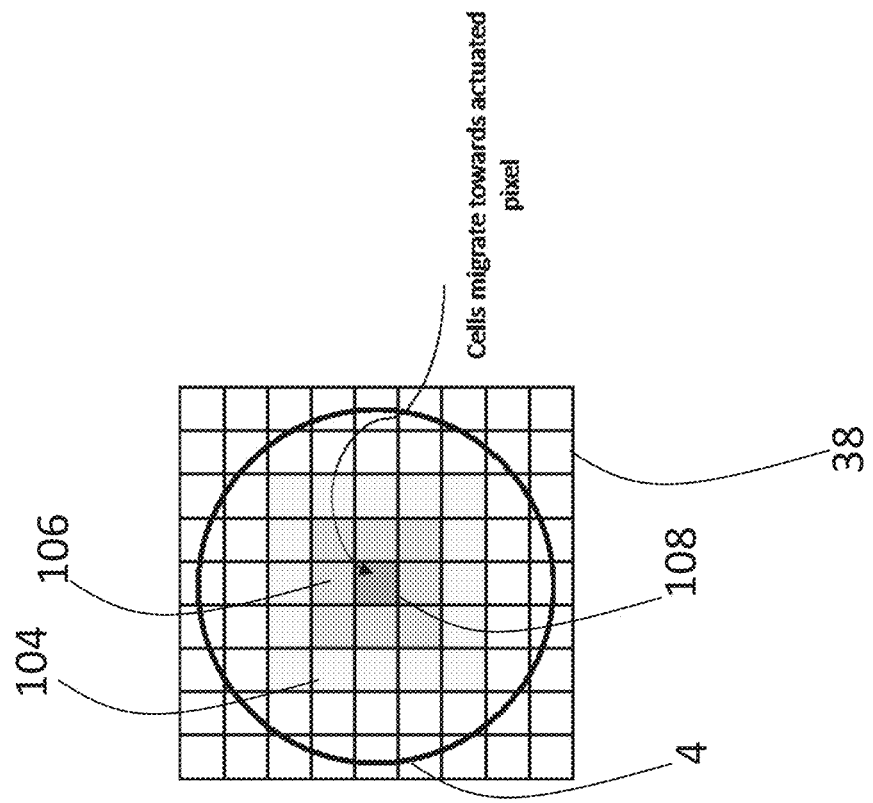
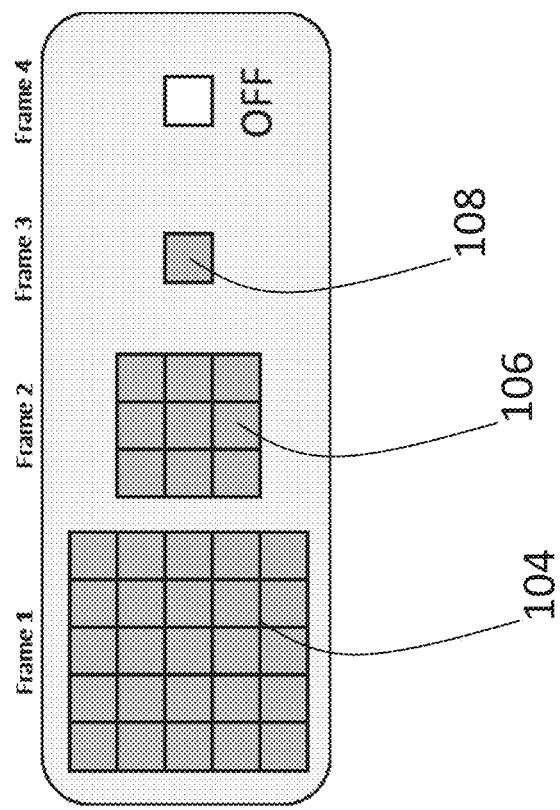
Fig. 6B

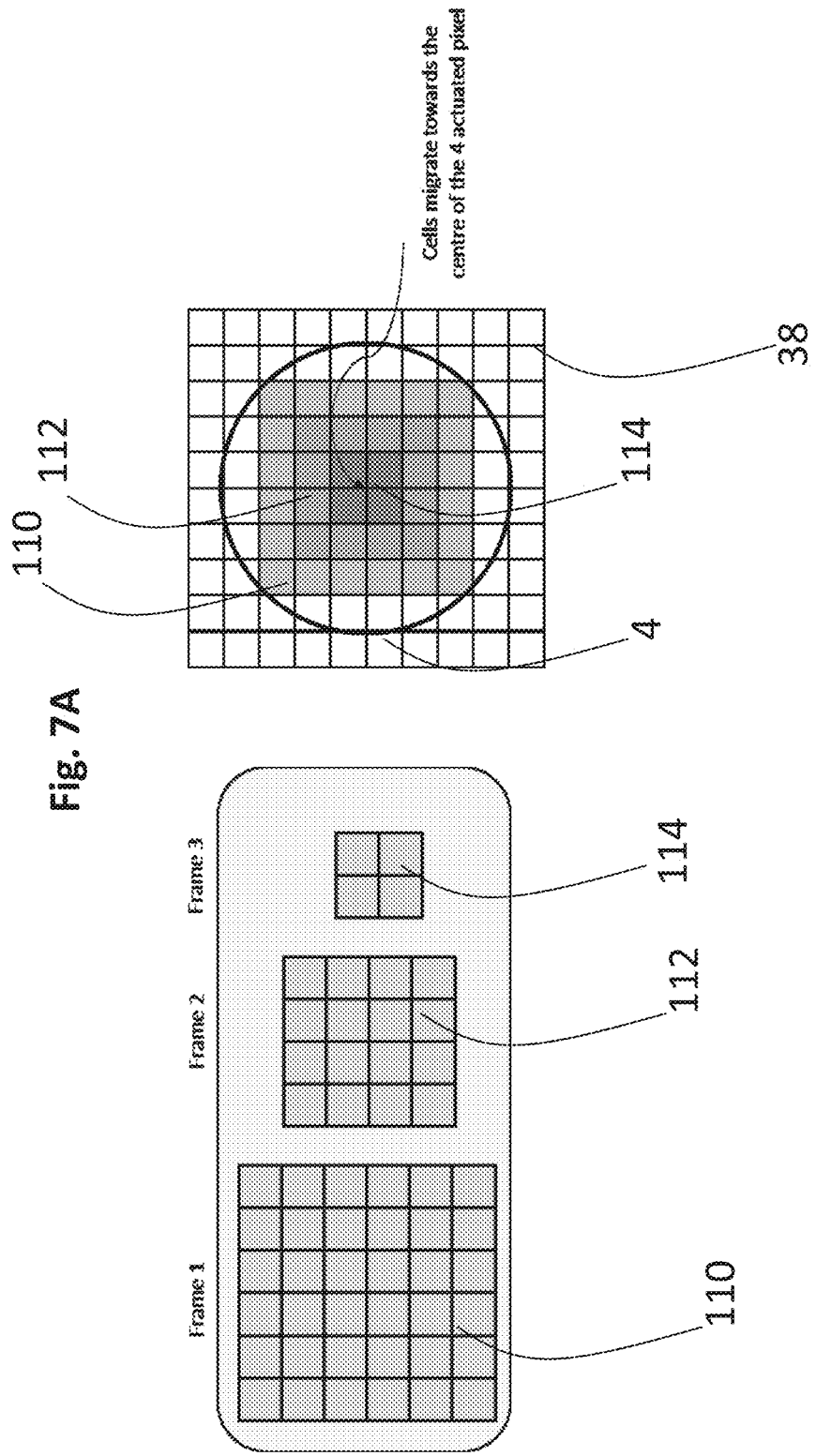

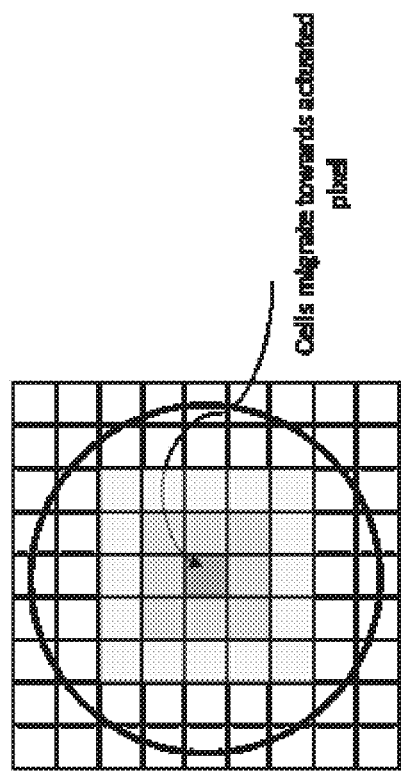
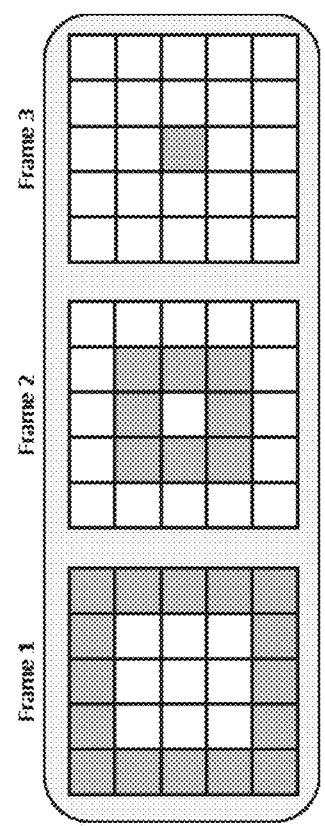
Fig. 8A

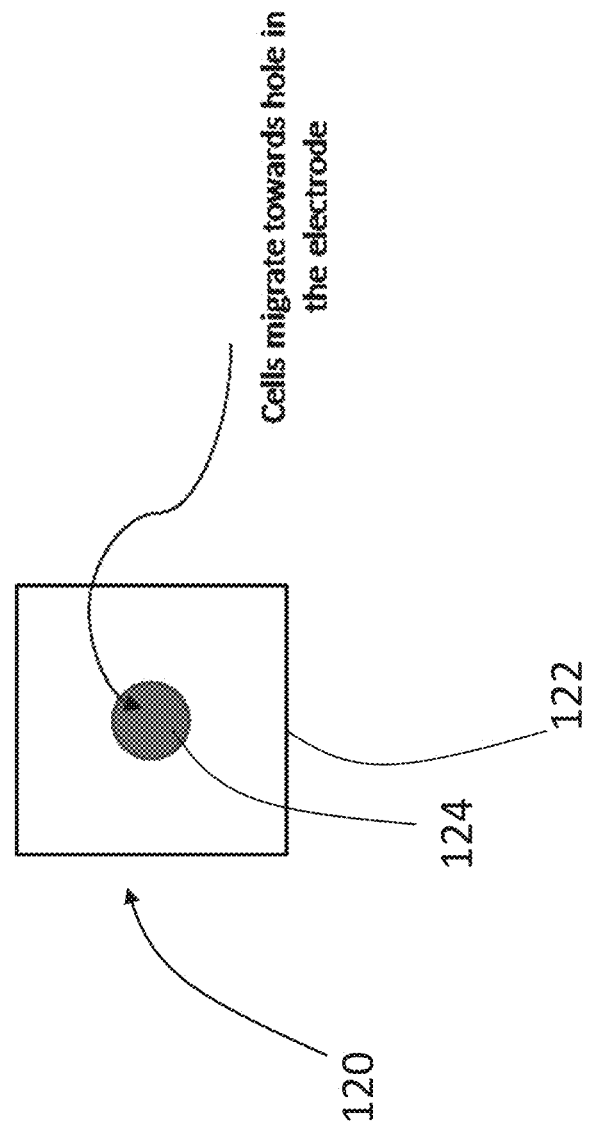

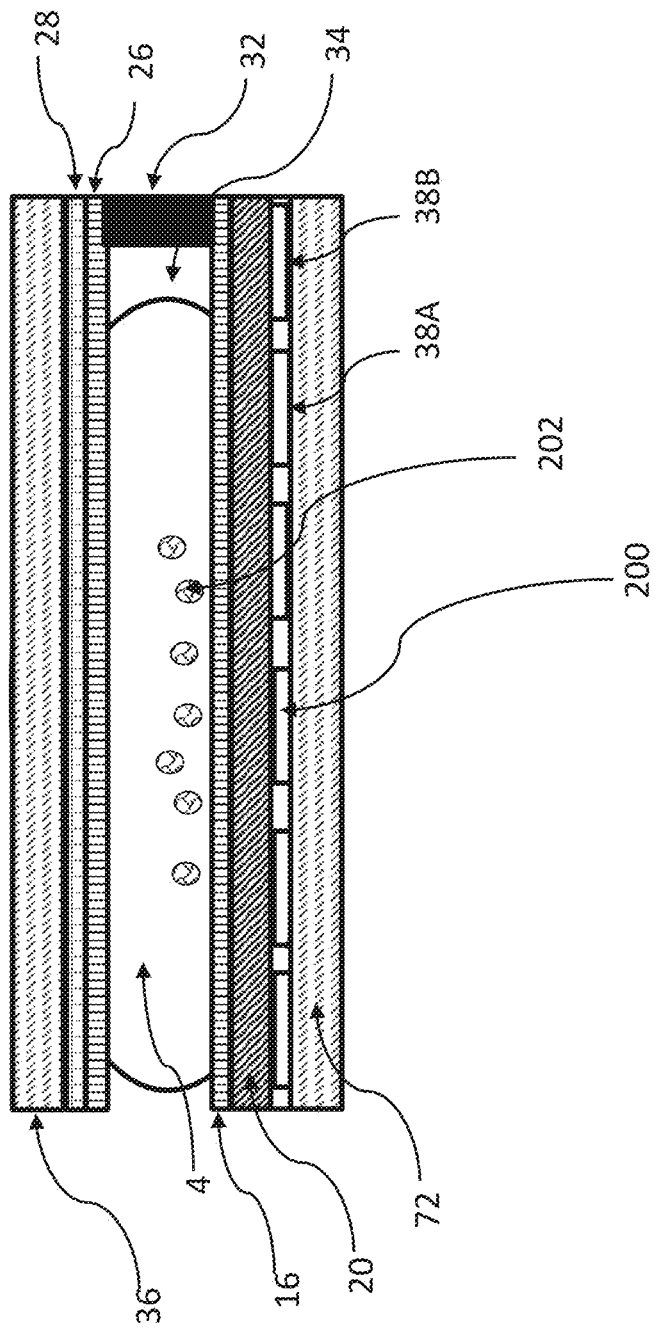

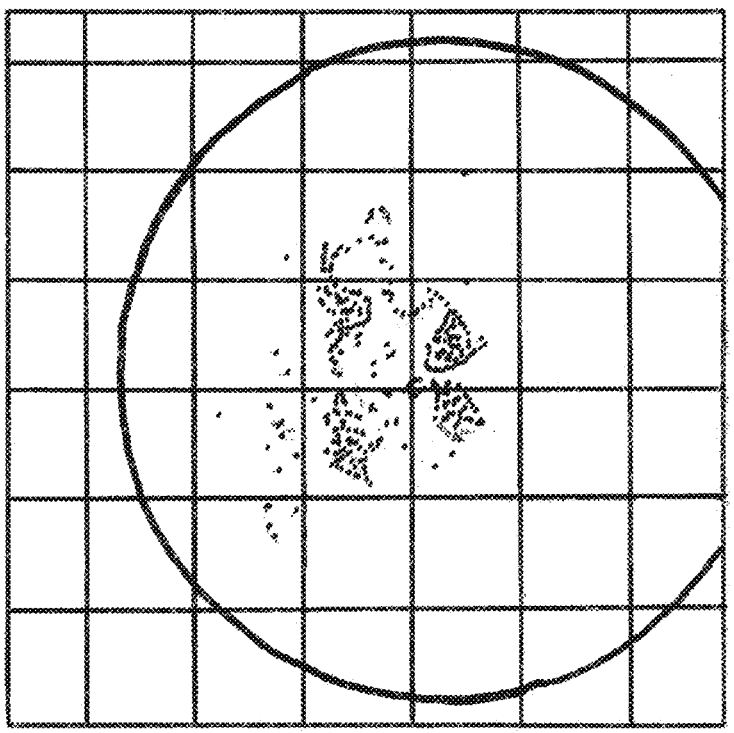
Fig. 12B Concentrated cells
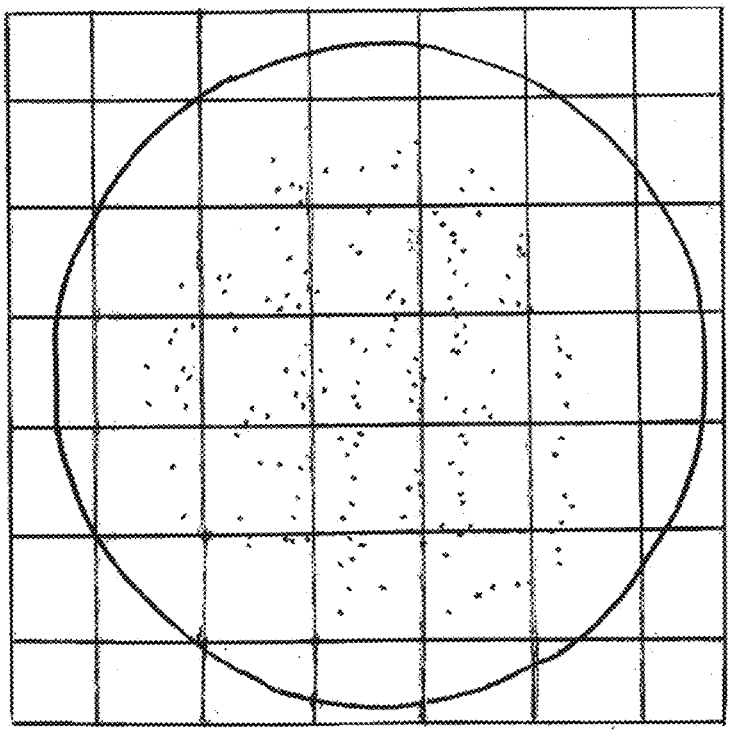
Fig. 12A Homogenous distribution of cells Polybeads suspended in dH$_2$O Polybeads suspended in RPMI Concentrated Jurkat cells
time t=15

Uniformly distributed Jurkat cells
time t=0

METHOD OF CONCENTRATING PARTICLES IN A LIQUID DROPLET USING AN EWOD DEVICE WITH SENSING APPARATUS

TECHNICAL FIELD

The present application relates to a microfluidic device, and to methods of concentrating particles within a liquid droplet disposed in such a device. More particularly, the present application relates to an electrowetting on dielectric (EWOD) microfluidic device such as, for example, an active matrix electrowetting on dielectric (AM-EWOD) microfluidic device. EWOD devices are known for manipulating droplets of liquid on an array of electrode elements. AM-EWOD refers to implementation of EWOD in an active matrix array incorporating transistors, for example by using thin film transistors (TFTs).

BACKGROUND ART

Microfluidics is a rapidly expanding field concerned with the manipulation and precise control of fluids on a small scale, often dealing with sub-microlitre volumes. There is growing interest in application of microfluidics to chemical or biochemical assays and synthesis, both in research and production, and applied to healthcare diagnostics to provide a "lab-on-a-chip" system. In a "lab-on-a-chip" implementation, the small nature of such devices allows rapid testing at point of need using much smaller clinical sample and reagent volumes as compared to traditional lab-based testing.

A microfluidic device has one or more channels (also referred to more generally as gaps) with at least one dimension less than 1 millimeter (mm). Common fluids analysed in microfluidic devices include whole blood samples, bacterial cell suspensions, protein or antibody solutions, and various buffers. Microfluidic devices can be used to obtain a variety of interesting measurements including molecular diffusion coefficients, liquid viscosity, pH, chemical binding coefficients, and enzyme reaction kinetics. Other applications for microfluidic devices include capillary electrophoresis, isoelectric focusing, immunoassays, enzymatic assays, flow cytometry, sample injection of proteins for analysis via mass spectrometry, PCR amplification, DNA analysis, cell manipulation, cell separation, cell patterning, and chemical gradient formation. Many of these applications have utility for clinical diagnostics.

Many techniques are known for the manipulation of fluids on the sub-millimeter scale, characterised principally by laminar flow and dominance of surface forces over bulk forces. Most techniques fall into the category of continuous flow systems, often employing cumbersome external pipework and pumps. Systems employing discrete droplets instead have the advantage of greater flexibility of function.

Electrowetting on dielectric (EWOD) is a well-known technique for manipulating discrete droplets of liquid by application of an electric field. It is thus a candidate technology for microfluidics for lab-on-a-chip technology. An introduction to the basic principles of the technology can be found in "Digital microfluidics: is a true lab-on-a-chip possible?" (R. B. Fair, Microfluid Nanofluid (2007) 3:245-281).

FIG. 1 shows a part of a conventional EWOD device in cross section. The device includes a lower substrate 72, on which is provided a conductive material which is patterned so that a plurality of array element electrodes 38 (e.g., 38A and 38B in FIG. 1) are realized. The electrode of a given array element may be termed the element electrode 38. The liquid droplet 4, including a polar material (which is commonly also aqueous and/or ionic), is constrained in a plane between the lower substrate 72 and a top substrate 36. A suitable gap between the two substrates constitutes a fluid chamber or channel gap between the two substrates, created, for example, by means of a spacer 32. A non-polar liquid 34 (e.g. oil) may be used to occupy that part of the volume of the channel gap not occupied by the liquid droplet 4. An insulator layer 20 disposed upon the lower substrate 72 separates the conductive element electrodes 38A, 38B from a first hydrophobic coating 16 upon which the liquid droplet 4 sits with a contact angle 6 represented by θ. The hydrophobic coating is formed from a hydrophobic material that is commonly (but not necessarily) a fluoropolymer.

On the top substrate 36 is a second hydrophobic coating 26 with which the liquid droplet 4 may come into contact. Interposed between the top substrate 36 and the second hydrophobic coating 26 is a reference or common electrode 28.

The droplets have a contact angle 6 with the hydrophobic surface of the insulator layer. The contact angle 6 is determined by the balancing of the surface tension components (1) from the hydrophobic coating 16 to the liquid of the droplets 4 ($\gamma SL$) interface, (2) from the liquid of the droplets 4 to the surrounding liquid medium 34 ($\gamma LG$) interface, and (3) from the hydrophobic coating 16 to the surrounding liquid medium 34 ($\gamma SG$) interface. When no voltages are applied to the device electrodes, the contact angle 6 satisfies Young's law, and is of size θ given by the equation:

$$\cos\theta = ((\gamma SG - \gamma SL)/\gamma LG) \quad \text{(Equation 1)}.$$

In operation, voltages termed the electrowetting (EW) drive voltages, (e.g. $V_T$, $V_0$ and $V_{00}$ in FIG. 1) may be externally applied to different electrodes (e.g. reference electrode 28, element electrodes 38, 38A and 38B, respectively). The resulting electrical forces that are set up effectively control the hydrophobicity of the hydrophobic coating 16. By arranging for different EW drive voltages (e.g. $V_0$ and $V_{00}$) to be applied to different element electrodes (e.g. 38A and 38B), the liquid droplet 4 may be moved in the lateral plane between the two substrates 72 and 36.

FIG. 2 is a drawing depicting additional details of an exemplary AM-EWOD device in schematic perspective, which may incorporate the layered structures in FIG. 1. The AM-EWOD device has a lower substrate 72 with thin film electronics 74 disposed upon the lower substrate 72, and a reference electrode (not shown, but comparable to reference electrode 28 above) is incorporated into an upper substrate 36 (corresponding to the upper substrate of FIG. 1). Alternatively, the electrode configuration may be reversed from that shown in FIG. 2, with the thin film electronics being incorporated into the upper substrate and the reference electrode being incorporated into the lower substrate. The thin film electronics 74 are arranged to drive array element electrodes 38. For example, the thin film electronics 74 associated with an array element electrode may include one or more thin-film transistors (TFTs) that are controlled by an EWOD control unit. A plurality of array element electrodes 38 are arranged in an electrode or element array 42, having X by Y configuration of array elements where X and Y may be any integer. A liquid droplet 4, which may include any polar liquid and which typically may be aqueous, is enclosed between the lower substrate 72 and the upper substrate 36 separated by a spacer 32, although it will be appreciated that multiple liquid droplets 4 can be present.

As described above with respect to the representative EWOD structure, the EWOD channel or gap defined by the two substrates initially is typically and preferably filled with the nonpolar filler liquid 34 (e.g. an oil). The liquid droplets 4 including a polar material, i.e., the droplets to be manipulated by operation of the EWOD device, are inputted from an external reservoir of liquid into the EWOD channel or gap. The external reservoir may, for example, be a pipette or may be a structure incorporated into the plastic housing of a microfluidic instrument that receives the EWOD device. As the liquid from the reservoir for the droplets is inputted, filler liquid gets displaced and is removed from the EWOD channel.

Example configurations and operation of EWOD devices are described in the following. U.S. Pat. No. 6,911,132 (Pamula et al., issued Jun. 28, 2005) discloses a two-dimensional EWOD array to control the position and movement of droplets in two dimensions. U.S. Pat. No. 6,565,727 (Shenderov, issued May 20, 2003) further discloses methods for other droplet operations including the splitting and merging of droplets, and the mixing together of droplets of different materials. U.S. Pat. No. 7,163,612 (Sterling et al., issued Jan. 16, 2007) describes how TFT based thin film electronics may be used to control the addressing of voltage pulses to an EWOD array by using circuit arrangements very similar to those employed in active matrix display technologies.

EWOD devices are useful for miniaturising and automating biochemical/chemical processes through the manipulation of aqueous droplets in an oil matrix. EWOD devices, for example, may be used to split, move, merge and mix droplets. Typically, biochemical/chemical workflows involve carrying out a sequence of reactions on biological/chemical samples, with each step involving the merging of one or more droplets containing the reagents necessary for that step with the sample droplet. The process of merging of droplets containing reagents into the sample droplet means that the volume of the sample droplet typically increases as the workflow proceeds, and the reaction droplet's composition becomes the sum of the workflow product(s) and any remaining reactants and by-products.

An EWOD device is typically operated as part of a microfluidic system comprising a control system configured to control actuation voltages applied to the electrode array of the EWOD device (or other microfluidic device) to perform manipulation operations as to the liquid droplets. For example, FIG. 3 is a schematic block diagram depicting operative portions of a microfluidic system 1. The system 1 includes an EWOD (or other microfluidic) device 2, in this example an active matrix EWOD (AM-EWOD) device, and an electronic control unit 3. The control unit 3 includes electrode control electronics 3a and a processor 3b running appropriate software stored on a non-transitory computer reader medium 3c, which may be any suitable computer readable storage device. The storage device 3c may store any application software and any data associated with the system. The electrode control electronics 3c generates, under control of the processor 3b, actuation data signals 5 constituting actuation voltages that are applied to the element electrodes 38 and a common electrode 28 as referenced above of the microfluidic device 2, for example to effect a pre-determined sequence of droplet manipulation operations. FIG. 3 shows the processor 3b as separate from the control electronics 3a and communicating with the control electronics 3a over a datalink 7, although the processor 3b and the control electronics 3a could alternatively be integral with one another. FIG. 3 shows the electrode control electronics 3a as separate from the EWOD device 2 and communicating with the EWOD device via an electrical connector 8, but the control electronics 3a and the EWOD device 2 could alternatively be integral with one another. The control electronics may include suitable circuitry and/or processing devices that are configured to carry out various control operations relating to control of the EWOD device, such as a CPU, microcontroller or microprocessor.

The control electronics 3a may further receive sensor data signals 9 from one or more sensors (not shown) of the EWOD device 2. The sensor data signals 9 may include signals obtained by operating the EWOD array elements in a sensing mode via integrated sensing circuitry that is part of the array element circuitry, and/or may include signals obtained by one or more sensors external to the EWOD array elements such as, for example, one or more of illumination and/or detection optics, a thermal control unit, or magnetic systems for interacting with the droplets 4.

There are known methods of measuring the electrical properties of droplets in an EWOD device. Schertzer (Sensors and Actuators B 145 (2010) 340-347) describes how complex impedance measurement through the bottom substrate electrodes can determine droplet conductivity. US 2014/0194305 (Kayyem et al., published Jul. 10, 2014) also describes an electrowetting device with detection electrodes on the bottom substrate to perform electrochemical sensing. U.S. Pat. No. 7,163,612 (referenced above) describes how sensor circuitry may be integrated onto the top substrate.

Dielectrophoresis (DEP) is a technique which may be applied to manipulate particles suspended in a liquid medium, which was first demonstrated more than 50 years ago. In a recent review, Hughes (BIOMICROFLUIDICS 10, 032801 (2016)) discusses the development of DEP since it was first discovered.

DEP typically involves applying high frequency signals, on the order of MHz, the DEP force being associated with the bulk of the liquid (which differs from electrowetting forces which impart a surface effect). DEP is related to electrowetting, as the two mechanisms are, respectively, the high- and low-frequency limits of the electromechanical response of a polar liquid to an electric field. A detailed theoretical treatment exploring the relationship between EWOD and DEP is given by Jones et al, "Frequency-Based Relationship of Electrowetting and Dielectrophoretic Liquid Microactuation", Langmuir 2003, 19, 7646-7651. DEP may further be used to manipulate particles suspended in a liquid, a DEP force arising from the different dipole moments of the particle and the surrounding liquid. The DEP force is dependent on the size of the particle, the magnitude of the electric field and the difference in the complex permittivity between the particle and the liquid at the frequency of interest, as defined by the Clausius-Mossotti factor. Fan et al (Lab Chip, 2008, 8, 1325-1331) discloses cross-scale electric manipulations of cells and droplets by frequency-modulated dielectrophoresis and electrowetting, in which they discuss the theory of EWOD and DEP, noting that EWOD is typically performed using signals on the order of 1 kHz, whereas DEP uses signals on the order of 2 MHz.

Hadwen et al. (EP 2570188, published Mar. 20, 2013) discloses an active matrix device for liquid control by electrowetting and dielectrophoresis, and methods of driving, using a DC or relatively low frequency AC voltage waveform to manipulate droplets by EWOD along with a relatively high frequency AC voltage waveform for manipulating droplets by DEP.

In view of the above, therefore, conventional microfluidic systems would need to employ two different driving schemes or protocols to perform bulk liquid droplet manipulations using EWOD versus the manipulation of particles within given liquid droplets using DEP. In particular, low-frequency driving schemes would be employed to perform EWOD droplet manipulations, whereas high-frequency driving schemes would be employed to perform particle manipulations within the liquid droplets. With the use of such different frequencies, conventional systems would incorporate different sets of electrodes, with one set of electrodes being used for EWOD droplet manipulations and a second set of electrodes being used for DEP particle manipulations. This results in complex electrode structures and associated driving schemes that renders it difficult to implement both EWOD and DEP within a single microfluidic device.

SUMMARY OF INVENTION

Embodiments of the present application provide for methods for the manipulation and positioning of a particle or group of particles within an aqueous liquid droplet that is contained within an EWOD device. When cells, other particles, or comparable objects are contained within a liquid droplet on an EWOD device, the particles tend to be spread across the whole of the droplet footprint (either evenly or unevenly), which makes counting, identifying, condensing, or visualising cells/particles/objects difficult. Therefore, the ability to accurately move or control the position of cells/particles/objects within the footprint of a liquid droplet on an EWOD device would enable the positioning of a single particle or particles at a precise or concentrated location within a liquid droplet, which would improve the ability to count the number of and image cells or other particles in a low cell-density preparation, and to concentrate larger numbers of cells or other particles at the same location within the liquid droplet when using higher cell density preparations.

Selective positioning or movement of cells/particles/objects within a single droplet of polar liquid is achieved through the application of electrostatic forces by electrowetting actuation within the droplet that are intended to move objects contained within the droplet, but not cause bulk movement of the liquid droplet itself. The pattern of electric fields is achieved by actuating individual array elements or an organized group of array elements, contained beneath and within the perimeter of the liquid droplet, and in a defined time sequence. The perimeter of the droplet is herein defined as the line (often referred to as the contact line) defining the boundary edge of the liquid droplet where it contacts the hydrophobically coated upper surface of the array of EWOD electrodes.

The same electrodes driven in the same way can therefore be used for either droplet manipulations by EWOD, or movement of particles within the droplet by DEP, with advantages being in the use of the same electrodes for both processes and the way that the actuation pattern is applied. The advantage of having a time sequence of actuation patterns is that the sequence speeds up the movement of the cells/particles/objects within the liquid droplet.

Embodiments of the present application include methods to maximise the manipulation of a population of particles suspended within a polar liquid droplet surrounded by a non-polar liquid in an EWOD device to a discrete location within the droplet by the selective and coordinated actuation of a specific electrode or sequence of electrodes contained within a footprint of the droplet. Embodiments may include applying an actuation cycle of multiple actuation patterns of one or more array elements. The actuation cycle may include a first actuation pattern to actuate a first set of EWOD electrodes beneath and within a perimeter of the polar liquid droplet; applying a second actuation pattern to actuate a second set of EWOD electrodes within the perimeter of the first actuation pattern; and applying further actuation patterns until either the final EWOD electrode(s) is/are actuated above which point the particles are to be focused or concentrated in a selected location within the liquid droplet. Once the particles are focused or concentrated in the selected location, a droplet manipulation operation may be performed by applying electrowetting forces to split the droplet to yield a first sub-droplet that includes substantially all of the particles and a second sub-droplet that includes substantially none of the particles.

In exemplary embodiments, the actuation cycle may include sequentially applying a decreasing concentric series of actuation patterns to corral the particles to a region above the terminal electrode(s) of the actuation cycle, and holding the particles at the focused or concentrated location by intermittent actuation of the terminal electrode(s). The actuation patterns each may include a continuous actuation of a single array element or electrode at the centre of a droplet, or an alternating pattern of actuation voltage (on/off) or frequency of actuation switching. An actuation cycle may include the continuous or alternating pattern of an actuation voltage applied to array electrode groups sequentially decreasing in area from a starting area that is determined from the size of the droplet but inside the edges of droplet so as to mitigate causing the droplet to move in bulk, with subsequent actuation patterns of the cycle being in a decreasing number or area of electrodes relative to the starting area. The actuation areas of electrodes having a variety of patterns, such as a solid group of actuated electrodes, a ring of outer actuated electrodes surrounding an area of non-actuated electrodes, or a checkerboard pattern of actuated electrodes and non-actuated electrodes.

Embodiments of the present application may be used for separating different biological entities (e.g. protein from nucleic acid). In exemplary embodiments, a first population of particles is configured to capture protein and a second population of particles is configured to capture nucleic acid. The populations of particles have different dimensions and/or different compositions, and therefore different permittivities, and as such methods of the present application may be used to separate a particle type from another particle type under the influence of the resultant electric fields.

A microfluidic system and related methods of operating an electrowetting on dielectric (EWOD) device operate to concentrate particles within a liquid droplet dispensed onto an element array of the EWOD device. The method includes the steps of providing a non-polar liquid onto the element array of the EWOD device; providing a polar liquid droplet onto the element array of the EWOD device within the non-polar liquid, wherein the polar liquid droplet includes particles; and applying an actuation cycle comprising a plurality of actuation patterns, wherein at least one of the actuation patterns includes actuating one or more array element electrodes located within a perimeter of the polar liquid droplet, and the particles migrate within the polar liquid droplet to become concentrated within a portion of the liquid droplet at one or more array element electrodes corresponding to one of the plurality of actuation patterns.

To the accomplishment of the foregoing and related ends, the invention, then, comprises the features hereinafter fully described and particularly pointed out in the claims. The following description and the annexed drawings set forth in detail certain illustrative embodiments of the invention.

These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

FIG. 4A is a drawing depicting a first variation of a method to manipulate particles suspended in a polar liquid droplet.

FIG. 4B is a drawing depicting a second variation of a method to manipulate particles suspended in a polar liquid droplet.

FIG. 4C is a drawing depicting a timing diagram that indicates an exemplary square wave actuation voltage that is applied when an element electrode is in an ON vs. OFF state.

FIG. 5A is a drawing depicting a third variation of a method to manipulate particles suspended in a polar liquid droplet.

FIG. 5B is a drawing depicting a fourth variation of a method to manipulate particles suspended in a polar liquid droplet;

FIG. 5C is a drawing depicting the fourth variation of FIG. 5B, depicting the change in thickness of the non-polar liquid in proximity of element electrodes when actuation voltages are applied.

FIG. 6A is a drawing depicting a fifth variation of a method to manipulate particles suspended in a polar liquid droplet.

FIG. 6B is a drawing depicting a sixth variation of a method to manipulate particles suspended in a polar liquid droplet.

FIG. 7A is a drawing depicting a seventh variation of a method to manipulate particles suspended in a polar liquid droplet.

FIG. 8A is a drawing depicting a twelfth variation of a method to manipulate particles suspended in a polar liquid droplet.

FIG. 10 is a drawing depicting an alternative element electrode design that may be used with embodiments of the present application.

FIG. 11A and FIG. 11B are drawings depicting cross sectional views through an EWOD device providing a schematic representation of the manipulation of particles within a droplet by the methods of the present application.

FIG. 12A and FIG. 12B are drawings depicting the manipulation of red blood cells suspended within a polar liquid droplet in an AM-EWOD device.

DESCRIPTION OF EMBODIMENTS

Figure 1:
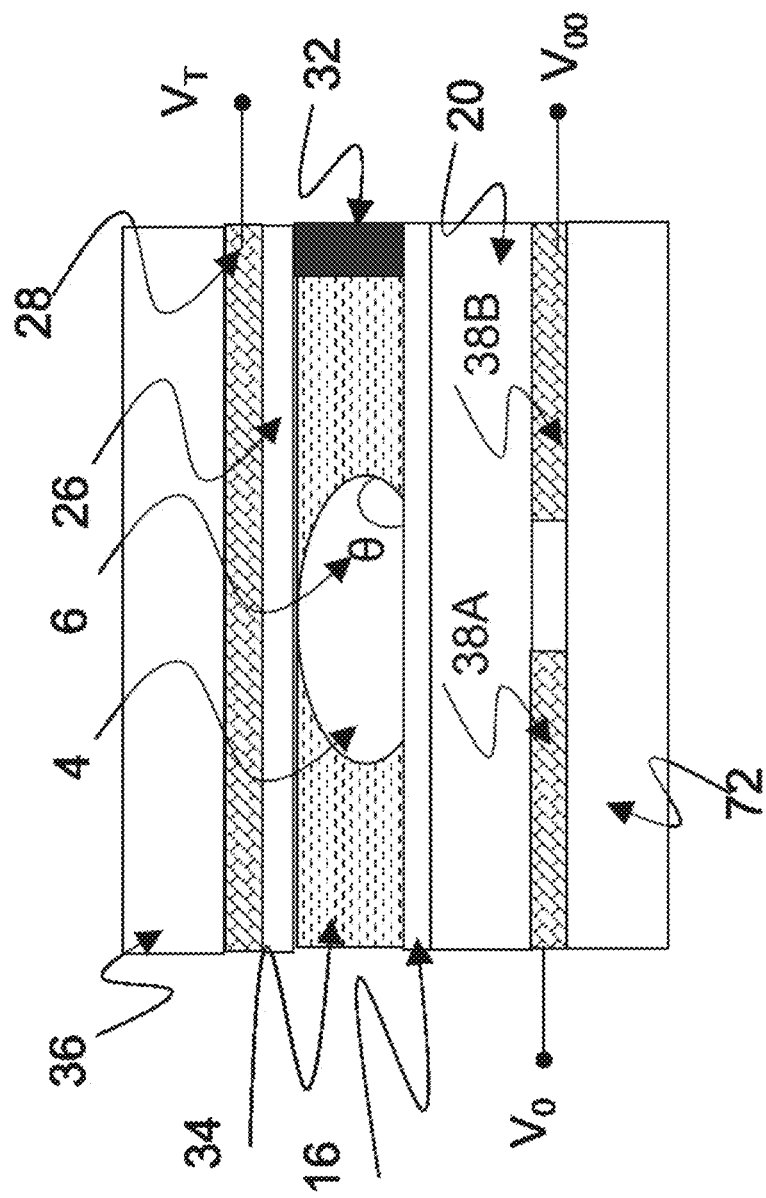
FIG. 1 is a schematic cross-sectional view of an EWOD device.

Embodiments of the present application will now be described with reference to the drawings, wherein like reference numerals are used to refer to like elements throughout. It will be understood that the figures are not necessarily to scale.

Figure 2:
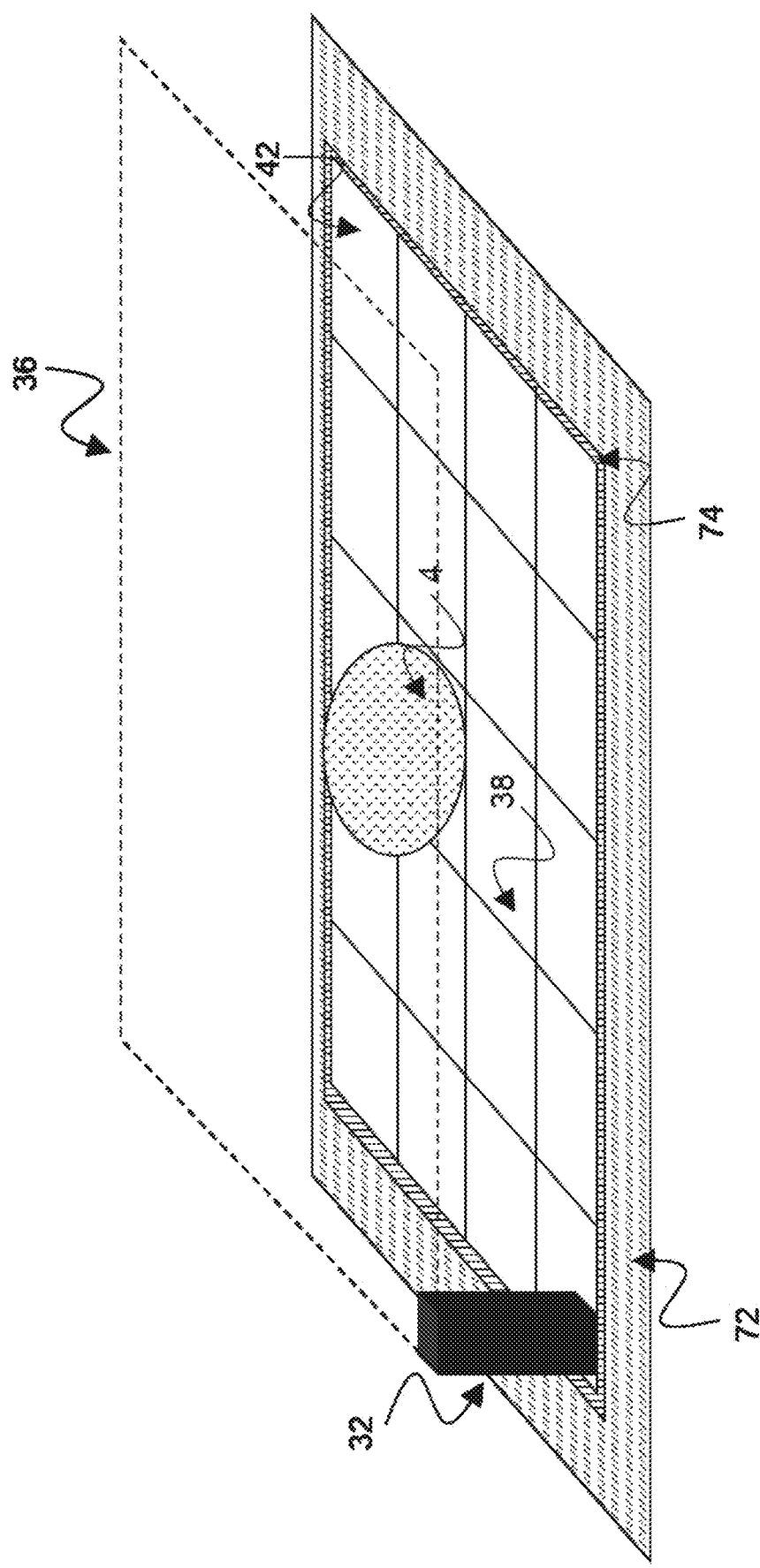
FIG. 2 is a schematic perspective view of an EWOD device.
Figure 3:
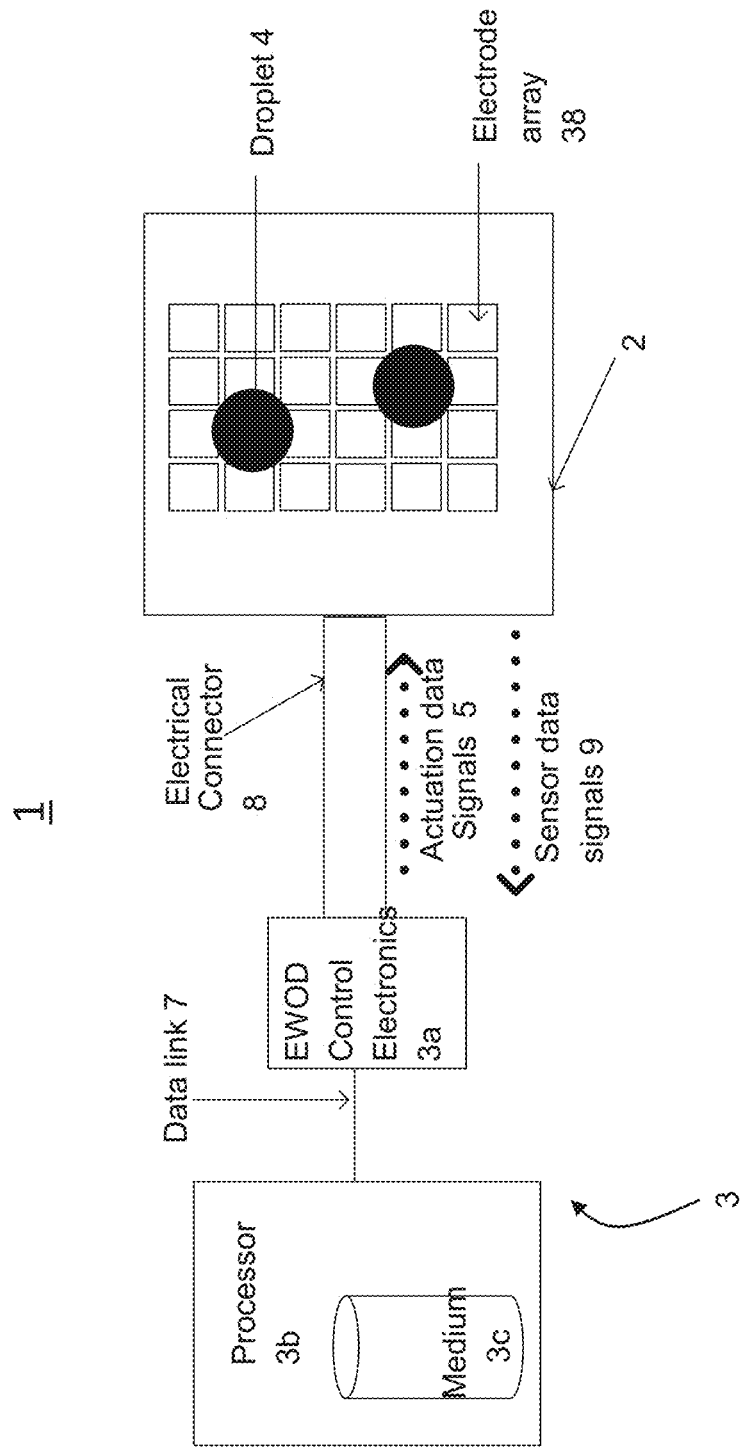
FIG. 3 is a schematic view of a microfluidic system including an EWOD device.

As indicated with reference to FIG. 2, the chamber of an EWOD device is typically first at least partially filled with a non-polar liquid, such as an oil, which occupies the space between upper substrate 36 and lower substrate 72 that is not occupied by polar liquid droplets 4. Polar liquid droplets 4 may be moved by electrowetting forces from one element electrode 38 of element array 42 to another, under the control of EWOD control unit 3, as described above with reference to FIG. 3. When a polar liquid droplet has been moved to a desired location within the EWOD channel of the EWOD device, a sensor which is integrated into the array element circuitry of individual element electrodes 38, produces feedback that indicates the location and size of a droplet, such as the number of element electrodes over which the droplet resides. Such sensor feedback is described, for example, in Applicants U.S. Pat. No. 10,078, 986 (Hadwen et al., issued Sep. 18, 2018), the contents of which are incorporated herein by reference.

FIGS. 4 through 8 are drawings depicting variations of methods of operating an EWOD device for manipulation of particles suspended within a polar liquid droplet by dielectrophoretic forces (DEP). When electrowetting forces that have been used to transport the liquid droplet to a desired location on the electrode array are removed, the droplet relaxes to adopt essentially a circular profile, when viewed from above. Once the location and size of a liquid droplet has been determined by electrowetting operations, a process to focus or concentrate particles, such as cells (alive or fixed), beads (polystyrene, latex, colloidal gold), magnetic/paramagnetic beads, proteins nucleic acids or other particles, that may be suspended within the polar liquid droplet may be performed.

FIGS. 4A and 4B depict a first variation in which a polar liquid droplet 4 is positioned over a plurality of array element electrodes 38, and in this example a 5×5 portion of element electrodes is contacted by the droplet. In this first example, a single element electrode 100 that is situated beneath and within the footprint of the droplet is actuated similarly to the actuation that would be applied to cause the droplet to move by electrowetting. It is preferred in EWOD operations in general and as used in embodiments of the current application that the actuation voltage is an alternating (AC) voltage signal. An AC voltage signal is preferred by EWOD systems in general to reduce effects of surface polarisation and charging, and to facilitate reliable and consistent movement of the liquid droplets. Typically, AC actuation is implemented with a square-wave voltage pulse of frequency in the range 10 Hz-10 kHz, with a value between 100 Hz-1 kHz commonly being preferred. A square wave, rather than a sinewave, may be chosen as more convenient to implement. Also, electrowetting actuation with a sinewave requires a peak voltage that is the square root of two larger than for a square-wave, the effective electrowetting voltage being the root mean square value. Also, square-wave actuation is more convenient for Active Matrix EWOD incorporating a TFT electronic backplane. The typical frequency for Active Matrix actuation with TFTs is between 100 Hz and 10 kHz, and higher frequencies are not preferred due to the increase in power consumption and the potential difficulties in passing high frequency signals through the TFT circuitry to the element electrodes. This is especially appreciable for large format arrays, comprising a large number of rows and columns. A typical square wave pulse signal may have rise times between 10 ns and 1 us, and typically around 100 ns.

AC actuation is preferred for particle manipulation with a liquid droplet for the purpose of controlling the movement of oil around the liquid droplet boundaries, as will be described below. In the case of AC actuation with a square-wave voltage signal, the effective frequency, with regard to the definition of the Clausius Mossotti factor and the consequent magnitude of the dielectrophoretic force may be calculated as the summation of the components from each contributory frequency component (for example as derived from a Fourier decomposition of the square wave actuation signal).

When such an actuation voltage is applied to an array element 100 located within the confines of the liquid droplet, particles that are suspended within the liquid droplet have a tendency to migrate under DEP forces toward the actuated array element electrode, as further detailed below. In the example of FIG. 4A, the array element electrode 100 is actuated continuously for the duration of the particle manipulation.

FIG. 4B depicts a variation of FIG. 4A in which the actuated array element 100 is not actuated or in an "ON" state continuously. Rather, the actuated array element 100 is driven in an actuation cycle including an alternating pattern of actuated "ON" frames (Frame 1) and non-actuated "OFF" frames (Frame 2). FIG. 4C depicts a voltage versus time plot of an exemplary actuation sequence, which may be applied for example to the actuation patterns in connection with the frames identified in FIG. 4B. The y-axis in FIG. 4C shows the potential difference between actuated element electrodes and the reference electrode, and the x-axis refers to time (not to scale). Typically, actuation is implemented using square wave voltage signals. The actuation period $T_{EW}$ of the ON state (1/actuation frequency), and a frame update time $T_{frame}$ (=1/frame update frequency) are indicated on the diagram. $EI_{on}$ (the square wave pattern) is representative of a frame being in an ON state, such as is depicted in FIG. 4B as Frame 1, and $EI_{off}$ (the flat line) is representative of a frame being in an OFF state, such as depicted in FIG. 4B as Frame 2. In exemplary embodiments as shown in FIG. 4C, $T_{frame}$ is on the order of 10's Hz and $T_{EW}$ is on the order of kHz.

With the electrowetting mechanism, a lateral motive force is applied when an actuation voltage is applied to one or more array elements 38 specifically located at the contact line of a liquid droplet, i.e. the boundary where the liquid droplet and the filler liquid (oil) where the liquid droplet contacts the hydrophobic surface that defines the EWOD channel. When such an actuation voltage has been applied to an element electrode located at the contact line of the liquid droplet, this changes the contact angle between the droplet and lower substrate 72, and the droplet is drawn by the electrowetting forces towards the direction of the applied actuation resulting in a bulk movement of the liquid droplet across the element array. Such droplet manipulations in which bulk droplets are affected constitute typical EWOD operation. Embodiments of the present application further provide for applying actuation voltages to manipulate particles within a liquid droplet by DEP forces as opposed to bulk movement of droplets by EWOD forces.

When manipulating particles within the liquid droplet as done in connection with FIGS. 4A and 4B, in contrast, the actuated element electrode 100 to which the actuation voltage is applied is within a perimeter of the liquid droplet rather than at the contact line. As referenced above, the perimeter of the droplet is herein defined as the line (often referred to as the contact line) defining the boundary edge of the liquid droplet where it contacts the hydrophobically coated upper surface of the array of EWOD electrodes. Accordingly, no motive force is applied at the edge of the droplet to cause the droplet to migrate across the surface of lower substrate 72. In other words, when the array element 100 beneath and within the perimeter of the liquid droplet is actuated in accordance with FIGS. 4A and 4B, there essentially is no bulk movement of the droplet. It further has been observed by the inventors that particles suspended within the liquid droplet will tend to migrate toward the actuated array element 100. In this manner, particles suspended within the liquid droplet may be manipulated in the absence of bulk movement of the droplet itself by actuating array elements beneath and within the perimeter of the liquid droplet rather than at the liquid droplet boundary.

As depicted in the example of FIG. 4A, a single element electrode 100 is actuated, in which a continuous ON state is applied for the duration of particle manipulation. Under such conditions a voltage is applied to the element electrode 100, which imparts a change in the relative hydrophobicity of the hydrophobic layer. All other element electrodes 38 within the perimeter of the liquid droplet remain in an OFF state. In the example of FIG. 4B, an actuation cycle is applied to the same single element electrode 100 as in FIG. 4A, whereby the array element electrode is initially actuated and then de-actuated in accordance with Frame 1 and Frame 2, thus cycling between ON and OFF states at a selected frame update frequency. For example, the update frequency may be between 0.1 Hz and 50 Hz, or between 1 Hz and 10 Hz. In one suitable example, a frame update frequency of 5 Hz is employed, i.e., the element electrode 100 is either ON or OFF for 200 ms at alternating intervals. Over a protocol period or duration of several minutes, particles that are suspended within the droplet migrate toward the actuated element electrode 100. The rate of migration of particles within the droplet toward the actuated element electrode has been observed to occur more rapidly when the actuation of the electrode is cycled ON/OFF at 5 Hz as illustrated in FIG. 4B versus being continuously held ON as illustrated in FIG. 4A. However, in the operation of both FIGS. 4A and 4B, particles under either condition of actuation are observed to accumulate in the region of the actuated element electrode 100 to which the voltage is applied over the duration of the actuation protocol.

FIGS. 5A and 5B illustrate a variation of the above method of FIGS. 4A and 4B, in which a plurality or region of array elements is actuated rather than a single array element electrode. In this example, the liquid droplet 4 is illustrated as having a diameter that approximately spans six of the element electrodes 38. In this example, a group or plurality of adjacent array elements 102 is actuated rather than a single array element electrode as in FIGS. 4A and 4B. FIGS. 5A and 5B illustrate an example in which the group of actuated adjacent array elements 102 constitutes a 2×2 pattern of element electrodes, although any suitable number of actuated array elements may be employed. Again, the actuated element electrodes are within the perimeter of the liquid droplet rather than intersecting with the perimeter/contact line, and thus the actuation has no effect on the edges of the droplet (i.e., the actuation does not result in bulk movement of the droplet by electrowetting). The use of an actuated group or plurality of adjacent array elements 102 may provide more enhanced particle manipulation in connection with larger liquid droplets as compared to actuation of a single array element, which may not be sufficient to affect particles across the entirety of the liquid droplet.

In the specific example of FIG. 5A, the plurality of element electrodes 102 is actuated continuously to remain in the ON state for the time of the particle manipulation protocol (similar to FIG. 4A for the single element actuation), whereas in the example of FIG. 5B the plurality of element electrodes 102 is intermittently actuated and de-actuated in Frame 1 and Frame 2 to cycle between ON and OFF states (similar to FIG. 4B for the single element actuation). In the example of FIG. 5B, the ON/Off frequency also may be 5 Hz corresponding to a 200 ms duration or period for each ON and OFF state. The rate of migration of particles towards the actuated 2×2 element electrode group was again higher when the electrodes were cycled between an ON and OFF states (FIG. 5B), compared to when they were continuously ON (FIG. 5A), although particle migration still is observed under either actuation condition. In addition, generally the rate of migration of particles towards the actuated element electrodes is greater, when all other conditions are the same, in the regional actuation example of FIGS. 5A/5B as compared to the single element actuation of FIGS. 4A/4B. The result of these various methods is to cause the particles to become concentrated at a desired location or within a desired portion of the liquid droplet.

The larger the liquid droplet including the particles to be manipulated, the more difficult it becomes to manipulate the particles to concentrate them at a particular location or portion of the liquid droplet, in that the particles initially may be located throughout the expanse of the larger droplet. Under certain circumstances, even actuating a plurality of array elements as done in connection with FIGS. 5A/5B may be insufficient to affect particles across the entire expanse of a relatively large droplet. Accordingly, FIGS. 6A and 6B depict examples of applying an actuation cycle that includes sequential actuation patterns that may be more suitable for larger droplets.

In the example of FIG. 6A, an actuation cycle constituting a sequence of a plurality of actuation patterns is applied across a reducing number of element electrodes 38. In this example, a first group of adjacent array elements 104 (e.g., 5×5 region of element electrodes in this example) is actuated in a first Frame 1 of the actuation cycle. Although the group 104 of actuated element electrodes is within the perimeter of the droplet, the corners of the actuated region of Frame 1 are approaching the edge or contact line of the droplet so as to cover a greater expanse of the liquid droplet. After a period of actuation of the first group 104, a second group of array elements 106 is actuated in a second Frame 2 of the actuation cycle, with the second group 106 having fewer array elements as compared to the first group 104. In this example, the 5×5 region actuation pattern of Frame 1 is reduced to a 3×3 region actuation pattern for Frame 2. After a period of actuation of the second group 106, a third group of array elements 108 is actuated in a third Frame 3 of the actuation cycle, with the third group 108 having fewer array elements as compared to the second group 106. In this example, the 3×3 region actuation pattern of Frame 2 is reduced to a single actuated array element for Frame 3.

The actuation pattern sequence may be cycled at a 5 Hz frame update frequency to switch frames, with each region thus being in an ON state for 200 ms for the given frame. In other words, each frame has an actuation duration of 200 ms, and thus the entire cycling through the three frames of FIG. 6A is 600 ms. For a given actuation cycle, as the actuation pattern decreases for subsequent frames, essentially the outer element electrodes are turned OFF, resulting ultimately in the single element electrode 108 remaining ON at Frame 3, and then the cycle is repeated for a duration of an actuation protocol suitable to focus or concentrate the particles at the single array element 108. In a variation depicted in FIG. 6B, a fourth Frame 4 is incorporated into the actuation cycle in which all element electrodes are in an OFF state. Using 5 Hz cycling with each frame lasting 200 ms, the entire cycle of FIG. 6B thus lasts 800 ms with Frame 4 included.

With further reference to the example of FIGS. 6A and 6B, as the actuation cycle is cycled through repeatedly over the three or four frames, particles increasingly are drawn toward the single element electrode 108. Accordingly, during an overall actuation protocol it will become unnecessary to employ the larger actuation pattern of Frame 1 as the particles become concentrated, and then the intermediate actuation pattern of Frame 2, as the particles are drawn closer and more concentrated about the single array element 108. An exemplary actuation protocol, therefore, may involve cycling through the various actuation patterns over a period of 30-40 minutes, with the largest actuation pattern being removed from the actuation cycle after a suitable period of time. Thus, with reference to FIG. 6B as an example, the full actuation cycle initially has a cycle duration of 800 ms as referenced above through Frames 1-4. After 10 minutes of this initial cycling, with the particles now being more concentrated, the 5×5 pattern 104 is no longer actuated as unnecessary, and thus each cycle begins with actuation of the 3×3 actuation pattern 106. This reduces the overall cycle time to 600 ms as the 5×5 actuation pattern is no longer actuated. After another 10 minutes (20 minutes from the start of the actuation protocol), with the particles now being even more concentrated, the 3×3 pattern 106 is no longer actuated as unnecessary, and thus each cycle begins with actuation of the single array element electrode 108. This reduces the overall cycle time to 400 ms (ON and OFF states) as both the 5×5 and 3×3 actuation patterns are no longer actuated. The result of the overall protocol is therefore to concentrate the particles about the single array element electrode 108. Accordingly, embodiments may include performing an actuation protocol including a first portion that includes the full actuation cycle, and a second portion that excludes the first frame. The actuation protocol further may include additional portions that successively eliminate frames concentrically beginning with the first frame until only an inner most concentric frame is actuated.

It will be appreciated that the number of actuation pattern frames in an actuation cycle, the size or number of array elements associated with each actuation pattern of each frame of the actuation cycle, the frame update frequency and resultant period of each frame in the actuation cycle, and/or the duration of protocol portions of the decreasing actuation patterns, may be varied depending on circumstances. Such parameters may be selected and optimized based on such variables as droplet size, droplet composition, particle type, and the like. Accordingly, FIGS. 7A-7F are drawings depicting variations in actuation cycles and component actuation patterns of each frame that may be employed in accordance with embodiments of the present application.

Figure 7B:
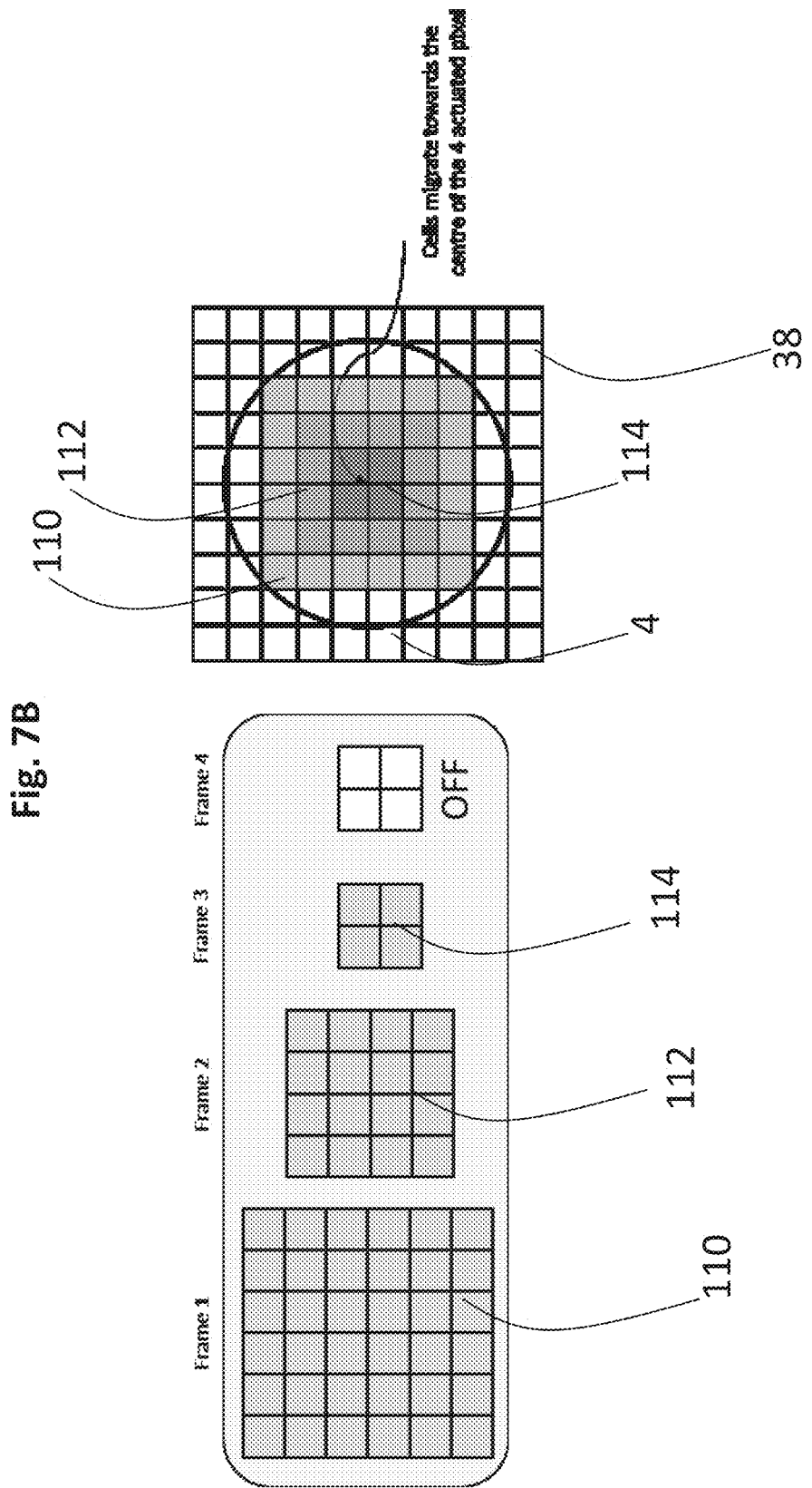
FIG. 7B is a drawing depicting an eighth variation of a method to manipulate particles suspended in a polar liquid droplet.

For even larger droplets, the example of FIG. 7A depicts an actuation cycle that employs a time sequence of larger actuation patterns for each frame as compared to the example of FIGS. 6A and 6B. In this particular example of FIG. 7A, a 6×6 actuation pattern 110 of Frame 1 is followed by a 4×4 actuation pattern 112 for Frame 2, and a 2×2 actuation pattern 114 for Frame 3. This example illustrates that with using actuation patterns of different sizes, the final actuation pattern may be larger than a single array element (comparably as illustrated in FIGS. 5A/5B). FIG. 7B illustrates a variation comparable to FIG. 6B in which a fourth Frame 4 is included in which all array elements are maintained in a de-actuated OFF state. Any suitable frequency/period of frames may be employed. For example, when a 5 Hz frame update frequency is employed, each frame has a duration of 200 ms which results in a full cycle time of 600 ms in FIG. 7A, and 800 ms in FIG. 7B that includes the fourth OFF Frame 4. In addition, a full reaction protocol may include time periods of decreasing actuation patterns, whereby all frames initially are employed in the actuation cycle, followed by a protocol portion in which Frame 1 is not part of the actuation cycle, followed by a protocol portion in which Frame 1 and Frame 2 are not part of the actuation cycle. In addition, the rate of change of the actuation patterns may be varied, as well as the number of cycles that may be performed when reducing from the largest to smallest actuation pattern.

Using sensor feedback from the EWOD array element circuitry or external sensors, the number of cycles that may be implemented in which the largest pattern is actuated may be dynamically altered. Thus, when sensor feedback indicates that particles occupying the portion of the droplet exposed to the largest actuation pattern (5×5 or 6×6 as depicted in FIGS. 6 and 7) have depleted, the EWOD control system may no longer actuate the largest pattern, such that only the intermediate and smaller patterns are actuated in sequence, until eventually only the smallest actuation pattern is used once the particles have been drawn to the desired location of the droplet. In the illustrated examples, the smallest actuation pattern is located centrally within the liquid droplet, but actuation cycles targeted toward any suitable location within a liquid droplet may be employed. Again, therefore, embodiments may include performing an actuation protocol including a first portion that includes the full actuation cycle, and a second portion that excludes the first frame. The actuation protocol further may include additional portions that successively eliminate frames concentrically beginning with the first frame until only an inner most concentric frame is actuated.

Figure 7C:
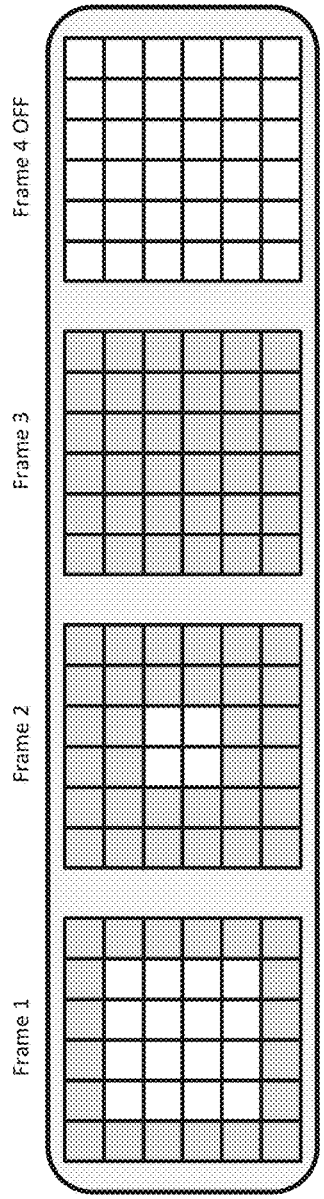
FIG. 7C and FIG. 7D are drawings a ninth variation of a method to manipulate particles suspended in a polar liquid droplet.
Figure 7D:
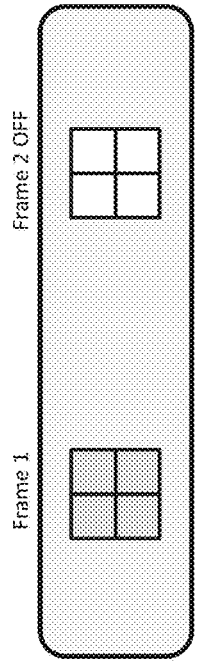

FIGS. 7C-7F illustrate additional variations of actuation cycles and component actuation patterns for each frame that also may be used for droplets of relatively larger diameter. In the example of FIG. 7C, an actuation cycle includes a time sequence of actuation patterns that are applied across the same number of element electrodes (e.g., a 6×6 element electrode in this example) but with central element electrodes not being actuated in all frames when the outer element electrodes are initially actuated (ON). Accordingly, in Frame 1 of the actuation cycle of FIG. 7C using a 6×6 element array, an outer layer of element electrodes is actuated while an inner 4×4 region remains de-actuated. In Frame 2 of the actuation cycle, the central de-actuation region includes a 2×2 region of element electrodes, and in Frame 3 of the actuation cycle the entire 6×6 region of array elements is actuated. In each passing frame, therefore, one more internal or central layer of array elements is added to the group of actuated array elements. Frame 4 of the actuation cycle, similarly as in previous embodiments, is an OFF frame in which all the array elements are de-actuated. The actuation cycle may be cycled at 5 Hz frame update frequency similarly as in previous embodiments, whereby each actuation pattern corresponds to a frame being ON for 200 ms. Moreover, after a period of time within an overall reaction protocol (for example 15 minutes), the actuation cycle can be changed such that the outer two layers of element electrodes are no longer actuated as illustrated in FIG. 7D. Accordingly, following a cycling as illustrated in FIG. 7C, a final state of the overall protocol is comparable to the actuation pattern of FIG. 5B, with a central 2×2 element electrode group switching between an ON and OFF state every 200 ms until the particles become sufficiently concentrated and the actuation protocol ends.

Figure 7E:
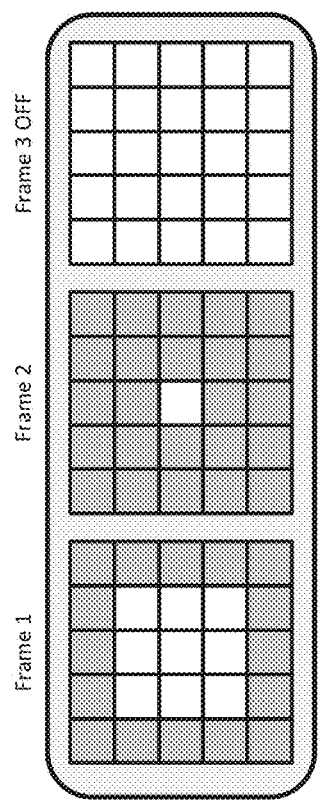
FIG. 7E is a drawing depicting a tenth variation of a method to manipulate particles suspended in a polar liquid droplet.

The example of FIG. 7E depicts a variation of an actuation cycle that operates similarly as in the embodiment of FIG. 7C, except that the size of the initial actuation pattern has an odd number of element electrodes (e.g., 5×5 region). Accordingly, in Frame 1 of the actuation cycle of FIG. 7E using a 5×5 element array, an outer layer of element electrodes is actuated while an inner 3×3 region remains de-actuated. In Frame 2 of the actuation cycle, the central de-actuation region includes a single array element, and Frame 3 of the actuation cycle is an OFF frame in which all the array elements are de-actuated. In each passing frame, therefore, one more internal or central layer of array elements is added to the group of actuated array element until the OFF frame is reached. The actuation cycle may be cycled at 5 Hz similarly as in previous embodiments, whereby each actuation pattern corresponds to a frame being ON for 200 ms. Moreover, after a period of time within an overall reaction protocol (for example 15 minutes), the actuation cycle can be changed such that the outer two rows of element electrodes are no longer actuated. Accordingly, following a cycling as illustrated in FIG. 7E, a final state of the overall protocol is comparable to the actuation pattern of FIG. 4B, with a central single element electrode switching between an ON and OFF state every 200 ms until the particles become sufficiently concentrated and the actuation protocol ends. As described above, when an element electrode is in an OFF state, it may be referred to as being "unactuated" or "de-actuated". The terms may be used interchangeably, as meaning a state in which no voltage is applied to the element electrode that would cause a change in the hydrophobic state of the hydrophobic layer covering the element electrode.

Figure 7F:
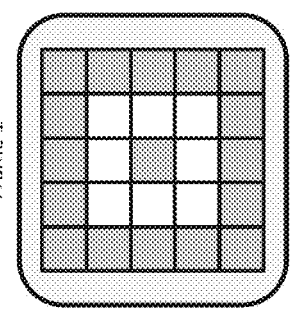
FIG. 7F is a drawing depicting an eleventh variation of a method to manipulate particles suspended in a polar liquid droplet.

In the example of FIG. 7F, the actuation cycle includes a Frame 1 having an actuation pattern in which a central single element electrode is actuated (ON) and a surrounding layer of six element electrodes that surround the central element electrode are not actuated (OFF). In addition, the outer layer of the 5×5 region including 16 element electrodes that in turn surrounds the 3×3 non-actuated region also are actuated (ON). In this example, therefore, the actuation pattern for Frame 1 includes a first layer of array element electrodes located beneath and within the perimeter of the liquid droplet that are actuated, a second layer of array element electrodes that includes one or more array element electrodes that are non-actuated and that are concentric relative to the first layer, and a third layer of array element electrodes that includes one or more array element electrodes that are actuated and that are concentric relative to the second layer. Frame 2 may then be an OFF state in which no electrodes are actuated comparably as in previous embodiments.

Again, it will be appreciated that in all the example actuation cycles of FIGS. 6A-7F, the rate of change of the actuation patterns may be varied from the 5 HZ frequency used in these examples as may be suitable for any particular application. In addition, the time period for switching to a final ON/OFF actuation pattern with a central actuated element or group of actuated elements also may be varied as may be suitable for any particular application.

Figure 8B:
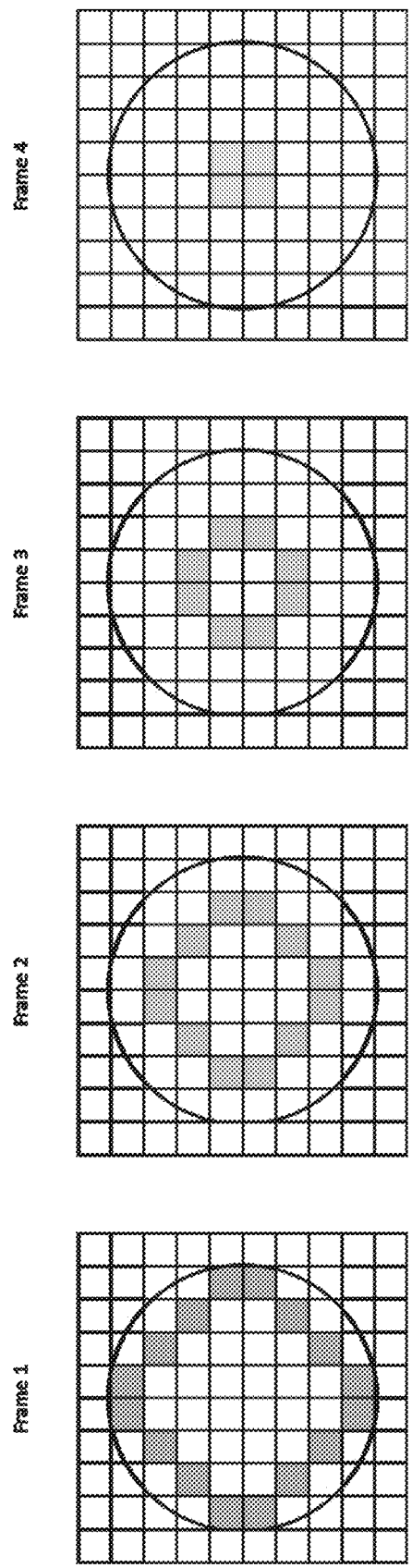
FIG. 8B is a drawing depicting a thirteenth variation of a method to manipulate particles suspended in a polar liquid droplet.

FIGS. 8A and 8B are drawings that depict additional examples of actuation cycles that employ non-solid actuation patterns of array elements for one or more frames in the actuation cycle. In the example actuation cycle of FIG. 8A, the initial actuation pattern of Frame 1 is a 5×5 ring pattern wherein an outer 5×5 layer of element electrodes is an ON state, whereas the inner 3×3 group of element electrodes is in an OFF state. With each passing frame, the actuation pattern is reduced by actuating a layer of element electrodes that is internal relative to the previous frame. Accordingly, in Frame 2 the actuation pattern is a 3×3 ring of element electrodes in an ON state, with a central element electrode and the outer 5×5 ring of element electrode in the OFF state. In Frame 3, a single central array element electrode is in the ON state with the other element electrodes being in an OFF state. The example of FIG. 8B depicts an actuation cycle in which the actuation patterns are not necessarily a square shaped grid of array elements. Similarly, as in FIG. 8A, in FIG. 8B each passing frame includes an actuation pattern that includes an internal layer of actuated array elements relative to a previous frame. The decreasing size of the actuation pattern as the actuation cycle cycles through the different frames once again acts to focus or concentrate particles suspended in the droplet at the central region of the actuation pattern. In the various examples of FIGS. 8A and 8B, therefore, the actuation cycle includes frames of a decreasing internal or concentric groups of array elements. In other words, a latter frame includes array element electrodes that are concentric relative to array element electrodes of a previous frame.

Any suitable cycling frequency may be employed comparably as in previous embodiments, and dynamic sensor feedback may be used to determine when it is no longer necessary to actuate the outermost pattern as particles are drawn towards the center of the actuation pattern. Thus, the duration of a protocol to concentrate particles at a desired location may be minimised through the selective control of the EWOD control system, based on real time sensor feedback.

Figure 9:
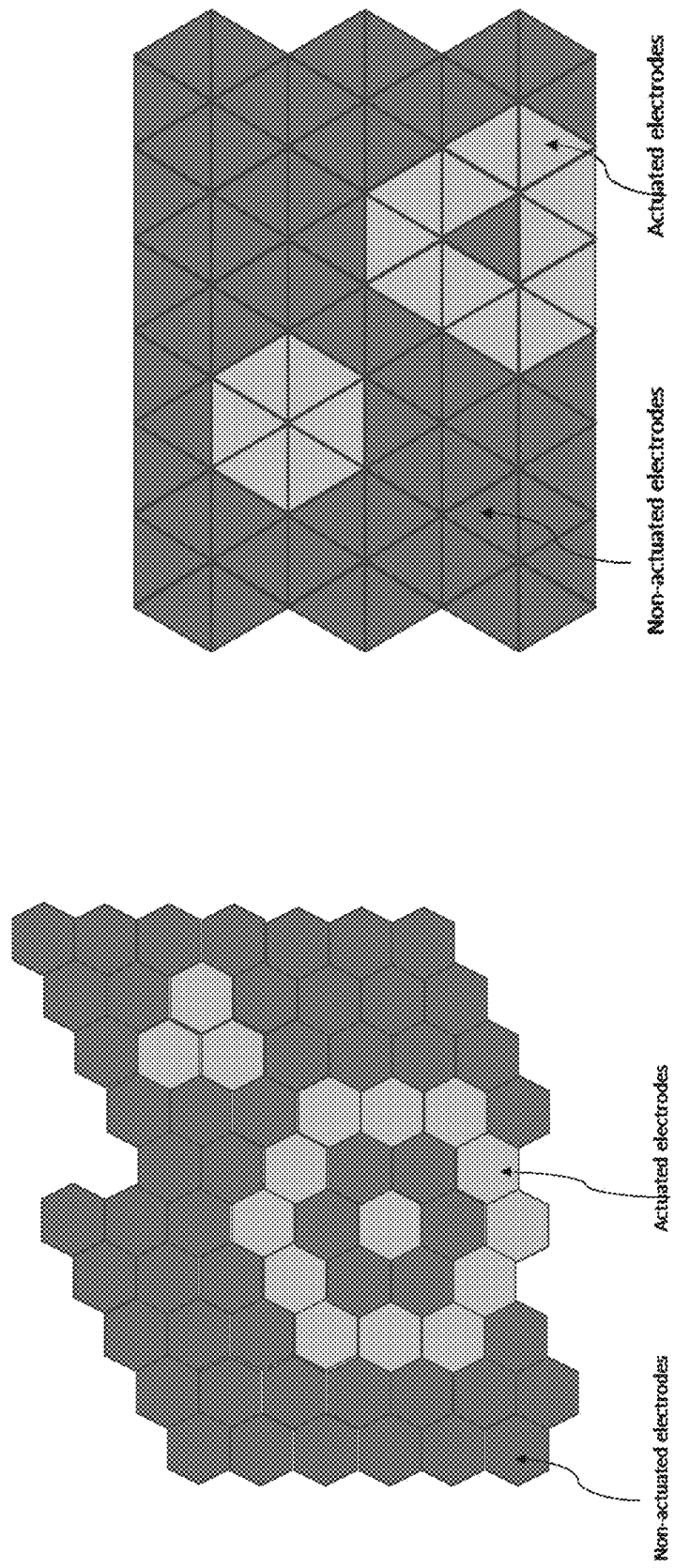
FIG. 9 is a drawing depicting alternative element array designs that may be used with embodiments of the present application.

In the previous embodiments, each of the array elements is based on square shaped array element electrodes. Other shapes of array element electrodes may be employed, as illustrated in the examples of FIG. 9. The examples of FIG. 9, as representative, depict actuation patterns that may be employed using element electrodes that have either hexagonal or triangular shapes. Electrodes of other shapes similarly may be employed to generate application patterns as may be suitable for use in a given application. Other examples may include the use of non-straight edges between electrodes, such as for example interdigitated fingers that effectively blur the interface between electrodes, and thus at least from the perspective of electrowetting may improve the rate of movement of a droplet from one electrode to another, since there is no longer a "hard" gap between the electrodes over which the droplet must move. Other tessellating patterns of array element electrodes may be employed, thereby permitting formation of a range of actuation patterns, which may be preferable depending upon the size of the droplet within which particles are to be focused or concentrated.

Manipulation of particles in the various embodiments of FIGS. 4-9 by dielectrophoresis (DEP) within a liquid droplet has a frequency dependence that is governed by the Clausius Mossotti relationship, which defines how charges in a dipole distribute, and thus how a charged particle may migrate in an electric field, as described in Green et al (J. Phys. D: Appl. Phys. 33 (2000) 632-641). Green et al describe manipulation of particles suspended in an electrolytic solution, i.e., there is no presence of non-polar liquid surrounding the electrolytic solution comparably as in an EWOD device. The inventors have demonstrated that for successful manipulation of particles within droplets present in an EWOD device as described in the current application, the polar liquid droplets containing particles should be suspended in a non-polar liquid, such as oil, which occupies the space within the EWOD channel or gap surrounding the polar liquid droplets.

Under such circumstances, the inventors have observed that the non-polar liquid (oil) forms a thin oil film above and below the polar liquid droplet, such that there is a thin layer of non-polar liquid between the hydrophobic coating on the upper and lower substrates of the EWOD device and the polar liquid droplet. In accordance with the operation of the methods of the current application, under appropriate actuation conditions the oil film may be controlled to have a non-uniform thickness across the spatial extent of the polar droplet. Control of said oil film thickness is related to control of the actuation frequency of the actuation voltage. At appropriate frequencies, a greater thickness of oil is observed to accumulate at the gaps between electrodes which enhances the effect of manipulating the particles present in the liquid droplet. Also significant in this regard is the dimension of the gap between adjacent element electrodes. The inventors have found that an electrode gap of less than 10 um, or around 4 um, is favourable for producing large "pillars" or "pockets" of oil at the intersections between electrode gaps (i.e. around the facing corners of four adjacent element electrodes).

These principals may be illustrated with reference back to FIGS. 5A and 5B as a suitable example. FIG. 5C is an additional schematic representation showing a plan view from above, and a cross sectional view along line A-A', indicating a droplet of polar liquid 4 located over a 2×2 block of element electrodes 38, as described above with respect to FIG. 5B. When an actuation ON pattern is applied to the 2×2 element electrodes, the non-polar liquid 34 surrounding the droplet is excluded from between the hydrophobic coating over the surface of the element electrodes, as the polar liquid is pulled closer to the coating surface which has become less hydrophobic due to the applied actuation voltage. A portion of the non-polar liquid 34 is caused to pile up at the junction between the 2×2 block of element electrodes, creating a pillar like structure 35 of non-polar liquid as identified in FIG. 5C. The optimum actuation voltage frequencies for forming non-uniform oil films, such as pillar 35 in FIG. 5C, are typically found to be in the range 100 Hz-10 kHz. The preferred frequency may be determined by experiment, which may include visual observation of the oil through a microscope or using other suitable sensing devices, and dependent on the properties (e.g. viscosity, density) of the liquid droplet and the oil. The inventors have correspondingly determined that the creation of a non-uniform oil film results in enhanced manipulation of particles suspended within the liquid droplet. The non-uniform oil film thickness results in the set-up of laterally directed electric fields within the body of the droplet. These electric fields penetrate into the droplet and can cause a force to be exerted on particles suspended within the droplet by the DEP mechanism for enhanced particle manipulation to concentrate the particles within a desired portion of the liquid droplet.

The inventors further have observed that the electric field which causes particles to move within a droplet by DEP is closely associated with the lower substrate upon which the element array is disposed. Inversion of the EWOD device, to place the element array upmost with respect to gravity, is shown to have no effect on the movement of droplets by EWOD. However, in such an orientation, no manipulation of particles suspended within polar liquid droplets is observed to occur due to DEP. There is thus an enhanced lateral electric field associated with the substrate on which the element array is disposed as a consequence of the thin film formed by the non-polar liquid, the shape of which may be modulated when voltages are applied to element electrodes, which draws the polar liquid more closely to the hydrophobic coating as a result of a change in contact angle. DEP forces therefore act on particles within the polar liquid droplet that are within close proximity to the substrate surface on which the element array is disposed. In the absence of non-polar liquid within the EWOD channel, no movement of particles within a polar liquid droplet is observed to occur.

Thus, unlike what has been described previously in the art (see Fan et al., Lab Chip, 2008, 8, 1325-1331), which has relied on using differently shaped electrodes to first manipulate droplets of polar liquid containing particles surrounded by non-polar liquid by EWOD with subsequent manipulation of particles within the droplet by DEP, embodiments of the present application utilise electrodes of the same size and shape to manipulate droplets by EWOD in combination with subsequent movement of particles within the droplets by DEP. This provides enhanced operation over conventional configurations, which have employed separate sets of electrodes and driving schemes to perform EWOD droplet manipulations versus DEP particle manipulations. Furthermore, conventional art has implemented different voltage regimens, with EWOD droplet manipulations being implemented with a 1 kHz square wave signal, whereas DEP particle manipulations are implemented with a 2 MHz signal. The enabling feature of the current invention is an appropriate choice of actuation frequency for setting up an appropriate pattern of oil film, of non-uniform thickness and essentially by the surface phenomenon of electrowetting, which creates a local, lateral, electric field in the interior of the droplet and facilitates the movement of particles within the droplet by DEP.

Unlike the disclosure of Fan et al. and comparable conventional art, in embodiments of the present application, common voltage regimens with comparable frequency characteristics have been applied to array element electrodes when performing both EWOD and/or DEP. Fan et al. further describes narrow electrodes used for manipulating particles by DEP: "Shuck electrodes establish a non-uniform electric field that is necessary for DEP actuations" with reference to Fan FIG. 2, which depicts cross sectional views through different regions of the described device, and relatively wide electrodes are used for EWOD and much narrower electrodes (Shuck electrodes) used for DEP manipulations. FIG. 2 of Fan particularly draws a distinction between the orientation of electric field lines between top and bottom substrate electrodes, emphasizing the non-uniform electric field that occurs when narrower electrodes are used. The additional "Shuck" or comparable electrodes described in the conventional art such as Fan are not necessary in accordance with embodiments of the current application, as the actuation cycles including the described actuation patterns may be employed to manipulate particles using the same electrodes that are employed to perform bulk droplet manipulations.

As referenced above in connection with FIG. 5C, application of the actuation voltages to manipulate particles tends to form a non-uniform oil layer, with oil gathering in particular at the junctions or gaps between electrodes to form the oil pillars 35. When the actuation pattern includes only a single element electrode, although the non-polar liquid (oil) tends to form an oil layer, a discrete pillar is not as readily formed as there are no gaps or junctions between multiple actuated electrode elements. Accordingly, to enhance formation of a better-defined oil pillar to create the non-uniform oil layer, the electrode structure may be modified so as to include a conductive portion that surrounds an inner non-conductive portion where an oil pillar may then form. Such embodiments permit the focusing or concentrating of particles into a compact cluster even when using a single electrode element as the actuation pattern.

In accordance with such features, FIG. 10 is a drawing depicting an exemplary array element electrode 120 for concentrating particles into a more compact cluster using a single electrode actuation pattern. The electrode 120 includes an outer conductive portion 122 that surrounds a center, non-conductive aperture 124. The non-conducting aperture 124 may be a hole in the electrode material or otherwise formed of a non-conductive material. Such an electrode design changes the electric field associated with the element electrode, which alters how particles are drawn toward and accumulate over the electrode. In particular, the aperture 124 creates a region of non-actuation similar to an electrode gap between multiple electrodes, at which an oil pillar can form to create the non-uniform oil layer. With such configuration, particles suspended within a liquid droplet will tend to migrate toward the aperture.

Figure 11B:
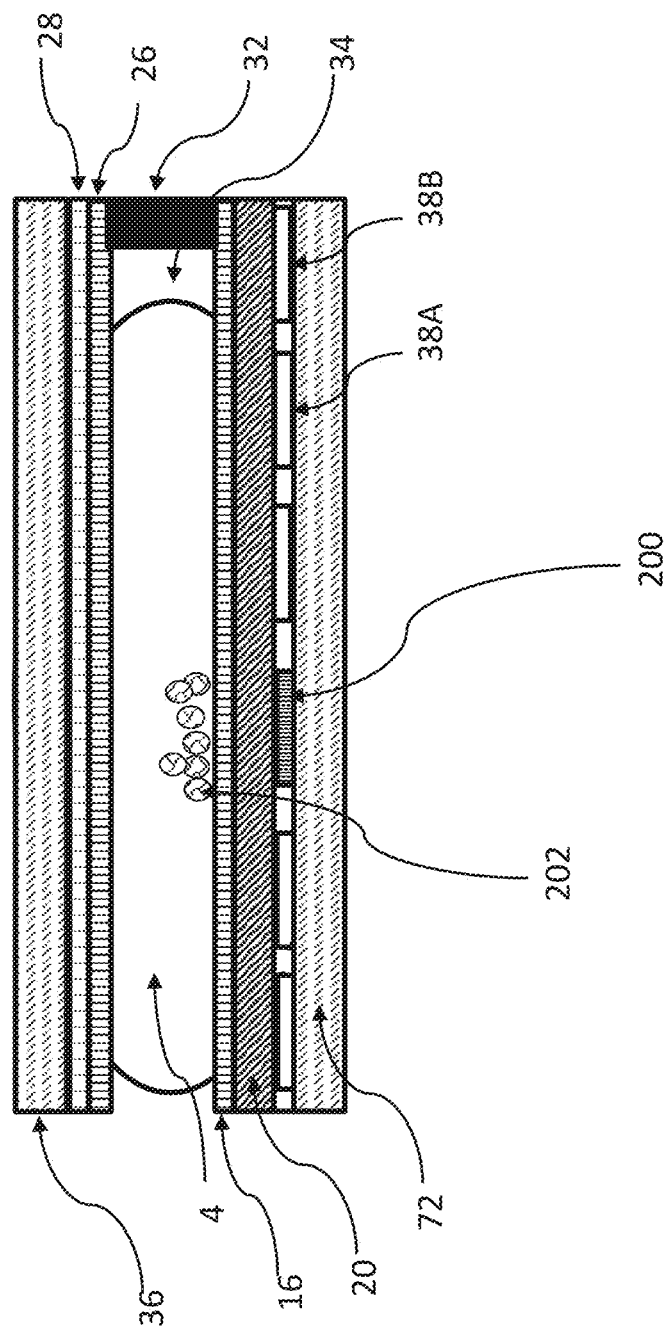

FIGS. 11A and 11B are cross sectional views through an EWOD device that demonstrate the manipulation of particles in accordance with embodiments of the present application. FIG. 11A depicts a liquid droplet 4 surrounded by non-polar liquid 34 within the channel gap of an EWOD device. Element electrodes 38A, 38B are disposed on lower substrate 72, over which is disposed an insulator layer 20 and hydrophobic coating 16. Particles 202 to be manipulated within droplet 4 generally exist closer to lower substrate 72 than upper substrate 36 due to gravitational sedimentation. When an element electrode 200 is actuated, as depicted in FIG. 11B, particles 202 are drawn towards the actuated electrode by DEP forces. Once particles 202 have been accumulated toward the centre of droplet 4, a droplet splitting operation then may be performed by EWOD operations to separate a portion of the droplet that has been concentrated with particles 202 from a portion devoid (or substantially devoid) of particles 202. Such an operation thus results in a droplet having an increased concentration of particles, which may be subjected to other processes within the EWOD device.

Referring back to FIG. 3, the methods of the present application may be implemented using any suitable EWOD based microfluidic system, such as for example the microfluidic system 1 illustrated in FIG. 3. The electronic control unit 3 may include suitable circuitry and/or processing devices 3b that are configured to carry out various control operations relating to control of the microfluidic device 2, such as a CPU, microcontroller or microprocessor. The microfluidic device 2 includes the element array of individual array elements 38 as described above, upon which liquid droplets 4 may be dispensed to perform droplet and particle manipulation operations by actuating and de-actuating one or more array elements. Control signals that control the actuation of the array elements may be implemented by the processor 3b via the EWOD control electronics 3a.

Accordingly, the electronic control unit 3 may execute program code embodied as a control application stored within the computer-based storage device 3c. It will be apparent to a person having ordinary skill in the art of computer programming, and specifically in application programming for electronic control devices, how to program the control system to operate and carry out logical functions associated with the stored control application. Accordingly, details as to specific programming code have been left out for the sake of brevity. The storage device 3c may be configured as a non-transitory computer readable medium, such as a random access memory (RAM), a read-only memory (ROM), an erasable programmable read-only memory (EPROM or Flash memory), or any other suitable medium. Also, while the code may be executed by control system in accordance with an exemplary embodiment, such control system functionality could also be carried out via dedicated hardware, firmware, software, or combinations thereof, without departing from the scope of the invention.

The following constitutes example uses of the principles of the current application.

Example 1—Separation of Red Blood Cells

Fresh whole human blood, collected in a Vacutainer containing $K_2$EDTA anticoagulant and stored at 4° C., was obtained from Research Donors Ltd. Erythrocyte (red blood cells) density was $5.5 \times 10^{12}$ cells/L at time of collection. The whole blood was diluted with RPMI 1640 Medium (Sigma-Aldrich R8758) containing 0.1% w/v Pluronic® F-127 (Sigma-Aldrich P2443) (by serial dilution) to achieve a concentration of $\sim 5.5 \times 10^6$ cells/ml.

A 5 μl reservoir drop of the diluted whole blood was loaded onto an Active Matrix Electrowetting on Dielectric (AM-EWOD) module, which includes an array of 210×210 μm electrodes separated by a 3 μm electrode gap. The module has a space between lower and upper substrates of 240 μm, which had been prefilled with a non-polar liquid. A 5×5 element electrode size droplet was dispensed from the (5 μl) reservoir drop and was moved by electrowetting operations to a desired position on the element array. To move cells contained within the 5×5 element electrode droplet, an actuation pattern was initiated including two individual frames. In the first frame a block of 2×2 element electrodes was actuated while in the second frame no element electrodes were actuated (similarly as described with reference to FIG. 5B). The 2×2 electrode block was within the footprint of the 5×5 element electrode expanse of the liquid droplet. Each frame was in an ON state for 200 ms and thus to cycle through the two frames took 400 ms. The module was placed on the stage of a stereo microscope (Nikon SMZ800N) and images were captured at 60 second intervals for 40 minutes using a digital camera (Infinity 2 camera, lumenera). An actuation voltage was applied as a ±9 V square wave, which was used for both electrowetting and cell movement.

As shown in FIG. 12A, at the start of the experiment the cells were homogenously distributed throughout the liquid droplet. After running the actuation cycle including the two frames for 30 minutes, the majority of the red blood cells had moved to be within the boundary of the 2×2 element electrodes that were actuated, as illustrated in FIG. 12B. The results show that red blood cells can be concentrated within a small portion of a liquid droplet by actuating electrodes within the footprint of the droplet.

Example 2—Separation of Poly Beads in Water Vs. Buffered Media

Moving particles by dielectrophoresis is dependent on the relative permittivity of the particles to be moved and the media tin which the particles are suspended, as described by the Clausius-Mossotti relation. To examine such conditions using an Active Matrix Electrowetting on Dielectric (AM-EWOD) device, the transport of polystyrene particles suspended in two different media was investigated. One set of experiments used polystyrene beads (Polybeads, 10 μm, 17136-5, Polysciences Inc.) that were briefly vortexed and then resuspended in RPMI 1640 Medium (Sigma R7388). 10 μl of the bead solution was added to 10 μl RPMI 1640 Medium (Sigma R7388) containing 0.4% Pluronic® F-127 (Sigma P2443). In a second experiment polystyrene beads (Polybeads, 10 μm, 17136-5, Polysciences Inc.) were briefly vortexed and resuspended in distilled $H_2O$. 10 μl bead-water solution was added to 10 μl distilled H2O containing 0.4% Pluronic® F-127 (Sigma P2443).

In the first experiment 5 μl of the bead-RPMI suspension was loaded onto an Active Matrix Electrowetting on Dielectric (AM-EWOD) module, which includes an array of 210× 210 μm electrodes separated by a 3 μm electrode gap. The module had a space between lower and upper substrates of 240 μm, which had been prefilled with a non-polar liquid. An 8×8 element electrode size droplet was dispensed from the larger (5 μl) reservoir drop and was moved by electrowetting to a selected position on the element array. To move the beads an actuation pattern was initiated including four individual frames. The first frame had a square block of 6×6 element electrodes that were actuated, and this was incrementally reduced in each successive frame such that a 4×4 square block, followed by a 2×2 square block, until finally, no element electrodes were actuated (similarly as depicted in FIG. 7B). Each frame was in an ON state for 200 ms and thus to cycle through all four frames took 800 ms. In the second experiment 5 μl of the bead-$H_2O$ suspension was loaded onto an Active Matrix Electrowetting on Dielectric (AM-EWOD) module, as in the first experiment. An 8×8 element electrode size droplet was dispensed from the larger (5 μl) reservoir drop and this was moved by electrowetting to a position on the element array. In this experiment because of the differences due to the changes in permittivity, only a single element electrode was continuously actuated (similarly as described with reference to FIG. 4A). For both experiments the AM-EWOD module was placed on the stage of a stereo microscope (Nikon SMZ800N) and images were captured at 60 second intervals for 15 minutes using a digital camera (Infinity 2 camera, lumenera). An actuation voltage was ±8 V square wave was applied for both electrowetting and cell movement.

Figure 13B:
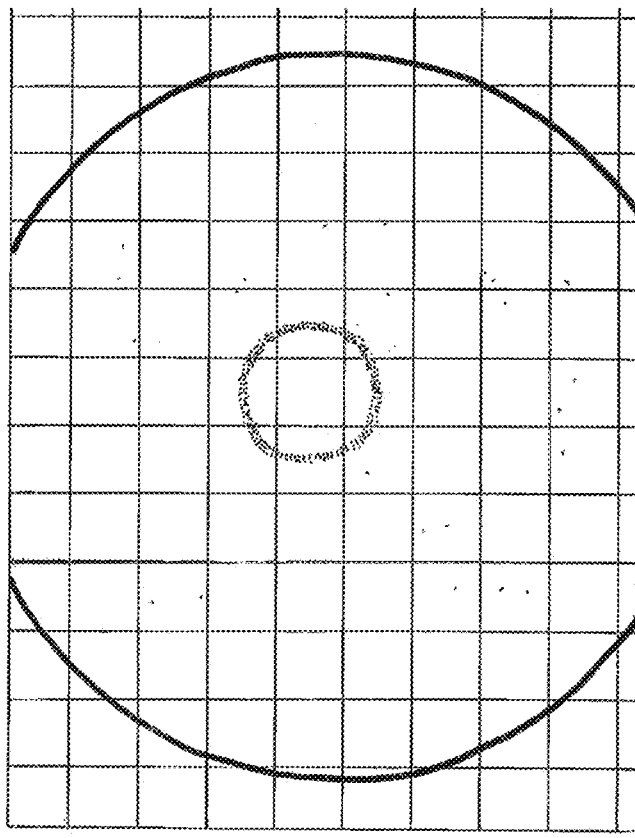
FIG. 13A and FIG. 13B are drawings depicting the manipulation of polymeric beads when suspended in buffered media or in distilled water.
Figure 13A:
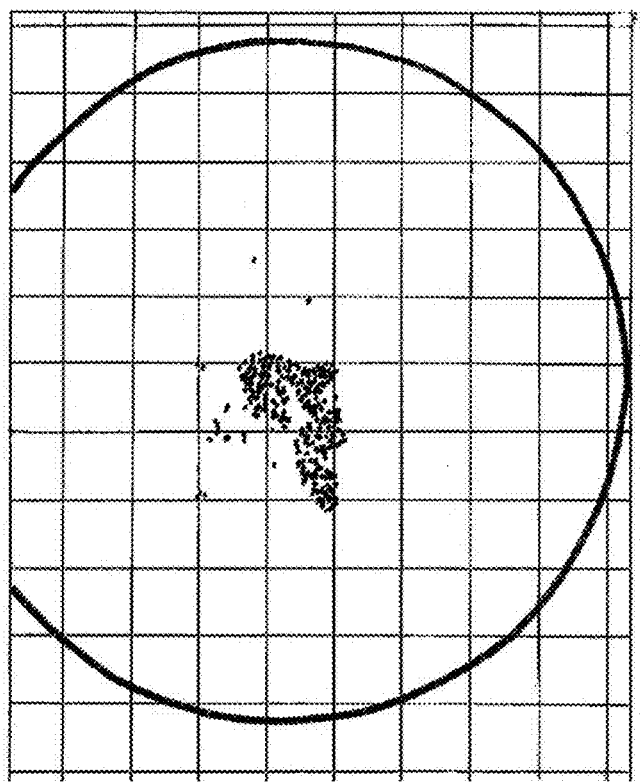

At the start of each experiment the beads were evenly distributed throughout the droplet (Images not shown) as was observed for the cell suspensions. After running the actuation cycle for 30 minutes the beads suspended in RPMI-1640 had moved and were now positioned within the boundary of the 2×2 element electrode array that was actuated as shown in FIG. 13A. In contrast the beads that were suspended in water had formed an ordered ring around the single actuated electrode as shown in FIG. 13B. The results demonstrate examples of positive and negative DEP that is determined not by the particle itself but by the relative permittivity of particle and the media surrounding the particle to the applied electric field across the surface of the AM-EWOD element array.

Example 3—Separation of Jurkat Cells in RPMI

Jurkat cells (Jurkat Clone E6-1) are a human, acute T cell lymphoma cell line isolated in the late 1970s from the peripheral blood of a young male patient suffering from T cell leukaemia. Jurkat cells were maintained in a complete culture medium RPMI 1640 (Sigma 8758) supplemented with +10% foetal bovine serum (Sigma F2442) and 100 units/ml penicillin+100 µg/ml streptomycin (Sigma P4458). Cells were cultured in a T25 flask in a humidified $CO_2$ incubator (5% $CO_2$; 37° C.). Prior to use in electrowetting experiments, Jurkat cells were first centrifuged (150 rcf for 5 mins) and then resuspended in RPMI 1640 Medium (Sigma R7388) to which was added to a final concentration HEPES (20 mM, pH 7.2) and 0.1% w/v Pluronic® F-127 (Sigma P2443) to a final concentration of ~$0.5 \times 10^6$ cells/ml.

In this example, a 5 µl aliquot of the diluted Jurkat cells were loaded onto an Active Matrix Electrowetting on Dielectric (AM-EWOD) module, which includes an array of 210×210 µm electrodes separated by a 3 µm electrode gap. The module had a space between lower and upper substrates of 240 µm, which had been prefilled with a non-polar liquid. A 5×5 element electrode size droplet was dispensed from the (5 µl) reservoir drop and was moved by electrowetting operations to a defined position on the element array in the module. To move the cells within the droplet, an actuation pattern was initiated including two individual frames. In the first frame a square block of 2×2 element electrodes was actuated while in the second frame no electrodes were actuated (similarly as described with reference to FIG. 5B). Each frame was in an ON state for 200 ms and thus to cycle through both frames took 400 ms. The module was placed on the stage of a stereo microscope (Nikon SMZ800N) and images were captured at 60 second intervals for 15 minutes using a digital camera (Infinity 2 camera, lumenera). An actuation voltage was applied as a ±9 V square wave, which was used for both electrowetting and cell movement.

Figure 14B:
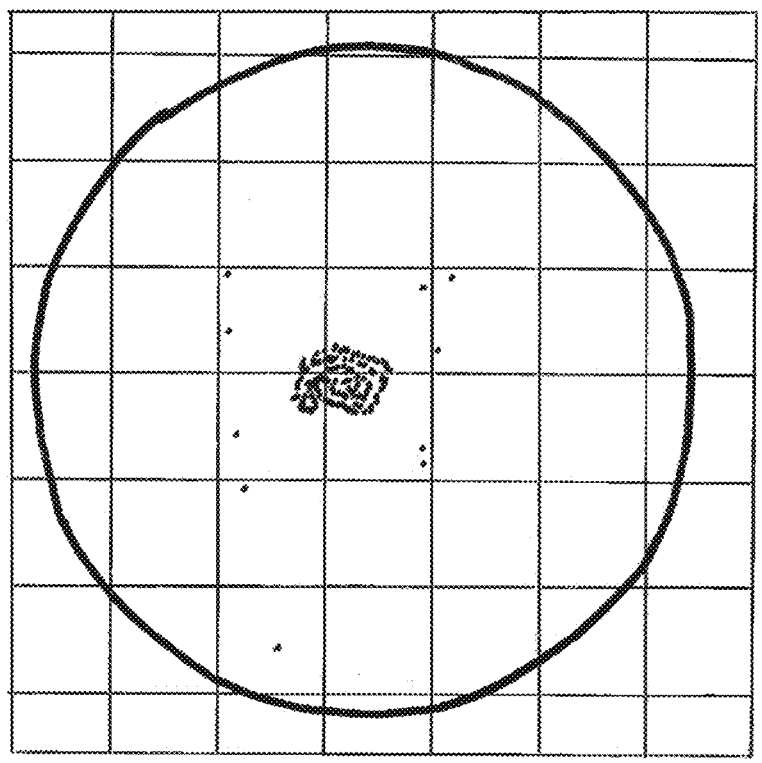
FIG. 14A and FIG. 14B are drawings depicting the manipulation of live Jurkat cells when suspended in buffered media.
Figure 14A:
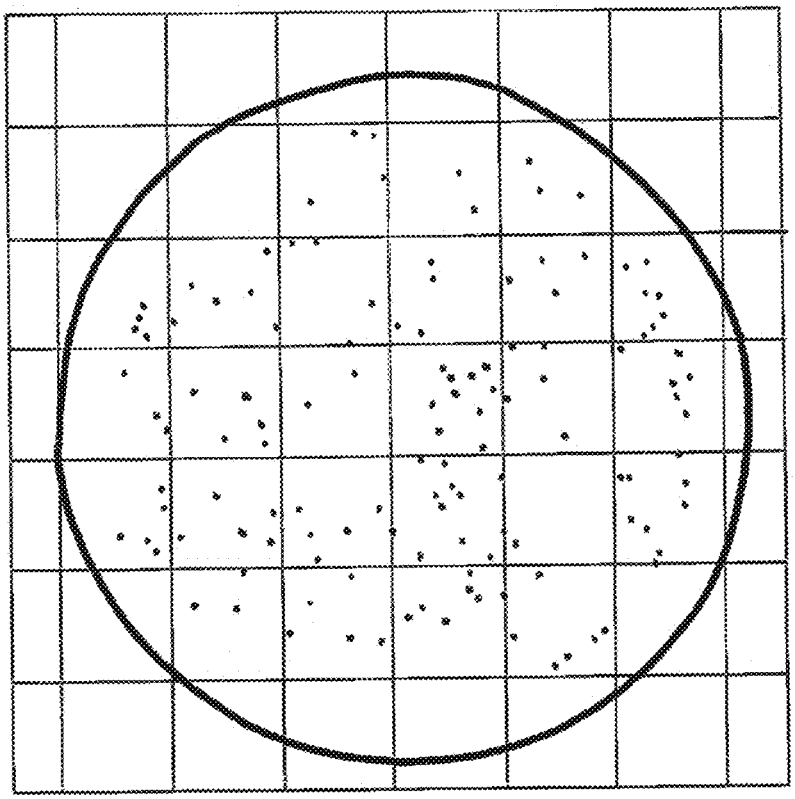

As shown in FIG. 14A, at the start of the experiment (time 0) the Jurkat cells were evenly distributed throughout the 5×5 element electrode size droplet. After running the actuation cycle for 15 minutes, the majority of live Jurkat cells had been transported by the applied DEP field and were now positioned within the boundary of the 2×2 element electrode pattern that was selectively actuated, as depicted in FIG. 14B. The results show that live Jurkat cells can be concentrated within a polar liquid droplet by actuating electrodes that are within the footprint of the polar liquid droplet. Once the cells have been concentrated the droplet can be subjected to other droplet operations such as splitting, either to exchange culture media or to use spent culture media for further processes, for example.

An aspect of the invention is a method of operating an electrowetting on dielectric (EWOD) device to concentrate particles within a liquid droplet dispensed onto an element array of the EWOD device. In exemplary embodiments, the method of operating includes the steps of: providing a non-polar liquid onto the element array of the EWOD device; providing a polar liquid droplet onto the element array of the EWOD device within the non-polar liquid, wherein the polar liquid droplet includes particles; and applying an actuation cycle comprising a plurality of actuation patterns, wherein at least one of the actuation patterns includes actuating one or more array element electrodes located within a perimeter of the polar liquid droplet, and the particles migrate within the polar liquid droplet to become concentrated within a portion of the liquid droplet at one or more array element electrodes corresponding to one of the plurality of actuation patterns. The method may include one or more of the following features, either individually or in combination.

In an exemplary embodiment of the method of operating an EWOD device, the actuation cycle comprises a plurality of time sequenced frames, each of the plurality of time sequenced frames including an actuation pattern of array element electrodes located within a perimeter of the polar liquid droplet.

In an exemplary embodiment of the method of operating an EWOD device, the plurality of time sequenced frames includes a frame in which all array element electrodes located within the perimeter of the polar liquid droplet are de-actuated.

In an exemplary embodiment of the method of operating an EWOD device, the actuation cycle comprises a first frame including a first actuation pattern of actuating one or more array element electrodes located within the perimeter of the polar liquid droplet at which the particles become concentrated, and a second frame in which all array element electrodes located within the perimeter of the polar liquid droplet are de-actuated.

In an exemplary embodiment of the method of operating an EWOD device, the actuation cycle comprises a first frame including a first actuation pattern of actuating only a single one of the array element electrodes located within the perimeter of the polar liquid droplet at which the particles become concentrated, and a second frame in which all array element electrodes located within the perimeter of the polar liquid droplet are de-actuated.

In an exemplary embodiment of the method of operating an EWOD device, the actuation cycle comprises a first frame including a first actuation pattern of actuating a plurality of array element electrodes located within the perimeter of the polar liquid droplet at which the particles become concentrated, and a second frame in which all array element electrodes located within the perimeter of the polar liquid droplet are de-actuated.

In an exemplary embodiment of the method of operating an EWOD device, the actuation cycle comprises a first frame including a first actuation pattern of actuating a first set of array element electrodes located within the perimeter of the polar liquid droplet, a second frame including a second actuation pattern of actuating a second set of array element electrodes located within the perimeter of the polar liquid droplet, and a third frame including a third actuation pattern of actuating a third set of array element electrodes located within the perimeter of the polar liquid droplet at which the particles are to be concentrated.

In an exemplary embodiment of the method of operating an EWOD device, the second set of array element electrodes has fewer array element electrodes than the first set of array element electrodes, and the third set of array element electrodes has fewer array element electrodes than the second set of array element electrodes.

In an exemplary embodiment of the method of operating an EWOD device, a latter frame includes array element electrodes that are internal relative to array element electrodes of a previous frame.

In an exemplary embodiment of the method of operating an EWOD device, the method further includes a fourth frame in which all array element electrodes located within the perimeter of the polar liquid droplet are de-actuated.

In an exemplary embodiment of the method of operating an EWOD device, the actuation cycle comprises a plurality of frames, wherein a first frame of the plurality of frames includes an actuation pattern of actuating an outer layer of array element electrodes located within the perimeter of the liquid droplet, and each successive frame of the plurality of frames includes an actuation pattern of actuating an additional layer of array element electrodes located concentrically within array element electrodes of a previous frame.

In an exemplary embodiment of the method of operating an EWOD device, the actuation cycle comprises a plurality of frames, wherein a first frame of the plurality of frames includes an actuation pattern of actuating an outer layer of array element electrodes located within the perimeter of the liquid droplet, and each successive frame of the plurality of frames includes an actuation pattern of actuating a layer of array element electrodes located internally within array element electrodes of a previous frame.

In an exemplary embodiment of the method of operating an EWOD device, the actuation cycle includes a frame having an actuation pattern including a first layer of array element electrodes located within the perimeter of the liquid droplet that are actuated, a second layer of array element electrodes that includes one or more array element electrodes that are non-actuated and that are concentric relative to the first layer, and a third layer of array element electrodes that includes one or more array element electrodes that are actuated and that are concentric relative to the second layer.

In an exemplary embodiment of the method of operating an EWOD device, the actuation cycle further comprises an additional frame in which all array element electrodes located within the perimeter of the polar liquid droplet are de-actuated.

In an exemplary embodiment of the method of operating an EWOD device, the method includes performing an actuation protocol including a first portion comprising an actuation cycle in accordance with any of the embodiments, and a second portion that excludes the first frame.

In an exemplary embodiment of the method of operating an EWOD device, the actuation protocol further includes additional portions that successively eliminate frames concentrically beginning with the first frame until only an inner most concentric frame is actuated.

In an exemplary embodiment of the method of operating an EWOD device, the one or more array element electrodes at which the particles become concentrated are centrally located within the perimeter of the liquid droplet.

In an exemplary embodiment of the method of operating an EWOD device, the actuation cycle comprises a plurality of frames corresponding to respective actuation patterns, and the frames are switched at a selected frame update frequency.

In an exemplary embodiment of the method of operating an EWOD device, the frame update frequency is between 0.1 Hz and 50 Hz.

In an exemplary embodiment of the method of operating an EWOD device, the frame update frequency is between 1 Hz and 10 Hz.

In an exemplary embodiment of the method of operating an EWOD device, an actuation signal applied to actuated array element electrodes is an alternating voltage of frequency in a range of 1 Hz-50 kHz.

In an exemplary embodiment of the method of operating an EWOD device, the method further includes performing a droplet manipulation operation to split the liquid droplet to yield a first sub-droplet comprising substantially all of the particles and a second sub-droplet comprising substantially none of the particles.

In an exemplary embodiment of the method of operating an EWOD device, the method further includes using feedback from a sensor within the element array to determine a location of particles within the droplet.

In an exemplary embodiment of the method of operating an EWOD device, the method further includes modifying the actuation pattern applied to element electrodes as particles are concentrated toward a particular element electrode.

Another aspect of the invention is a microfluidic system including an electrowetting on dielectric (EWOD) device comprising an element array configured to receive a non-polar liquid and a polar liquid droplet, the element array comprising a plurality of individual array element electrodes; and an electronic control unit configured to control actuation voltages applied to the element array to perform particle manipulation operations to concentrate particles within a portion of the polar liquid droplet by performing the method of operating an EWOD device according to any of the embodiments. The microfluidic system may include one or more of the following features, either individually or in combination.

In an exemplary embodiment of the microfluidic system, one or more array element electrodes includes a conductive region that surrounds a non-conductive aperture.

In an exemplary embodiment of the microfluidic system, the element array includes array element electrodes that are square shaped.

In an exemplary embodiment of the microfluidic system, the element array includes array element electrodes that are non-square shaped.

In an exemplary embodiment of the microfluidic system, the system further includes a sensor, wherein the electronic control unit is configured to use feedback from the sensor within the element array to determine a location of particles within the liquid droplet.

In an exemplary embodiment of the microfluidic system, the controller further is configured to modifying the actuation pattern applied to element electrodes as particles are concentrated toward a particular element electrode.

In an exemplary embodiment of the microfluidic system, the controller is configured to perform the method according to any of the embodiments by executing program code stored on a non-transitory computer readable medium.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

INDUSTRIAL APPLICABILITY

Embodiments of the present application may be used to provide enhanced operation of an EWOD device. The EWOD device could form a part of a lab-on-a-chip system. Such devices could be used in manipulating, reacting and sensing chemical, biochemical or physiological materials. Applications include healthcare diagnostic testing, material testing, chemical or biochemical material synthesis, proteomics, tools for research in life sciences and forensic science.

What is claimed is:

1. A method of operating an electrowetting on dielectric (EWOD) device to concentrate particles within a liquid droplet dispensed onto an element array of the EWOD device, the method of operating comprising the steps of:
providing a non-polar liquid onto the element array of the EWOD device;
providing a polar liquid droplet onto the element array of the EWOD device within the non-polar liquid, wherein the polar liquid droplet includes particles; and
applying an actuation cycle comprising a plurality of actuation patterns, wherein at least one of the actuation patterns includes actuating one or more array element electrodes located within a perimeter of the polar liquid droplet, and the particles migrate within the polar liquid droplet to become concentrated within a portion of the liquid droplet at one or more array element electrodes corresponding to one of the plurality of actuation patterns;
wherein the actuation cycle comprises a plurality of frames, each of the plurality of frames including an actuation pattern of actuated and de-actuated array element electrodes located within a perimeter of the polar liquid droplet, and the plurality of frames are sequentially performed in a time sequence; and
wherein the actuation cycle further comprises performing the time sequence of the plurality of frames over multiple iterations to concentrate the particles.

2. The method of operating an EWOD device of claim 1, wherein the plurality of frames includes a frame in which all array element electrodes located within the perimeter of the polar liquid droplet are de-actuated.

3. The method of operating an EWOD device of claim 1, wherein the plurality of frames comprises a first frame including a first actuation pattern of actuating one or more array element electrodes located within the perimeter of the polar liquid droplet at which the particles become concentrated, and a second frame in which all array element electrodes located within the perimeter of the polar liquid droplet are de-actuated.

4. The method of operating an EWOD device of claim 1, wherein the plurality of frames comprises a first frame including a first actuation pattern of actuating only a single one of the array element electrodes located within the perimeter of the polar liquid droplet at which the particles become concentrated, and a second frame in which all array element electrodes located within the perimeter of the polar liquid droplet are de-actuated.

5. The method of operating an EWOD device of claim 1, wherein the plurality of frames comprises a first frame including a first actuation pattern of actuating a plurality of array element electrodes located within the perimeter of the polar liquid droplet at which the particles become concentrated, and a second frame in which all array element electrodes located within the perimeter of the polar liquid droplet are de-actuated.

6. The method of operating an EWOD device of claim 1, wherein the plurality of frames comprises a first frame including a first actuation pattern of actuating a first set of array element electrodes located within the perimeter of the polar liquid droplet, a second frame including a second actuation pattern of actuating a second set of array element electrodes located within the perimeter of the polar liquid droplet, and a third frame including a third actuation pattern of actuating a third set of array element electrodes located within the perimeter of the polar liquid droplet at which the particles are to be concentrated.

7. The method of operating an EWOD device of claim 6, wherein the second set of array element electrodes has fewer array element electrodes than the first set of array element electrodes, and the third set of array element electrodes has fewer array element electrodes than the second set of array element electrodes.

8. The method of operating an EWOD device of claim 6, wherein a latter frame of the plurality of frames includes array element electrodes that are internal relative to array element electrodes of a previous frame of the plurality of frames.

9. The method of operating an EWOD device of claim 7, wherein the plurality of frames further comprises a fourth frame in which all array element electrodes located within the perimeter of the polar liquid droplet are de-actuated.

10. The method of operating an EWOD device of claim 1, wherein the plurality of frames comprises a first frame that includes an actuation pattern of actuating an outer layer of array element electrodes located within the perimeter of the liquid droplet, and each successive frame of the plurality of frames includes an actuation pattern of actuating an additional layer of array element electrodes located concentrically within array element electrodes of a previous frame.

11. The method of operating an EWOD device of claim 10, wherein the plurality of frames further comprises an additional frame in which all array element electrodes located within the perimeter of the polar liquid droplet are de-actuated.

12. The method of operating an EWOD device comprising performing an actuation protocol including a first portion comprising the actuation cycle in accordance with claim 10, and a second portion that excludes the first frame.

13. The method of operating an EWOD device of claim 12, wherein the actuation protocol further includes additional portions that successively eliminate frames of the plurality of frames concentrically beginning with the first frame until only an inner most concentric frame is actuated.

14. The method of operating an EWOD device of claim 1, wherein the plurality of frames comprises a first frame that includes an actuation pattern of actuating an outer layer of array element electrodes located within the perimeter of the liquid droplet, and each successive frame of the plurality of frames includes an actuation pattern of actuating a layer of array element electrodes located internally within array element electrodes of a previous frame.

15. The method of operating an EWOD device of claim 1, wherein the plurality of frames includes a frame having an actuation pattern including a first layer of array element electrodes located within the perimeter of the liquid droplet that are actuated, a second layer of array element electrodes that includes one or more array element electrodes that are non-actuated and that are concentric relative to the first layer, and a third layer of array element electrodes that includes one or more array element electrodes that are actuated and that are concentric relative to the second layer.

16. The method of operating an EWOD device of claim 1, wherein the time sequence comprises switching frames from one of the plurality of frames to a next one of the plurality of frames in the time sequence at a selected frame update frequency.

17. The method of operating an EWOD device of claim 16, wherein the selected frame update frequency is between 0.1 Hz and 50 Hz.

18. The method of operating an EWOD device of claim 1, wherein an actuation signal applied to actuated array element electrodes is an alternating voltage of frequency in a range of 1 Hz-50 kHz.

19. The method of operating an EWOD device of claim 1, further comprising using feedback from a sensor within the element array to determine a location of particles within the droplet, and modifying the actuation pattern applied to element electrodes as particles are concentrated toward a particular element electrode.

20. The method of operating an EWOD device of claim 1, wherein the actuation cycle includes a first portion in which the time sequence includes all frames of the plurality of frames, and a second portion in which the time sequence excludes at least one frame of the plurality of frames.

21. A microfluidic system comprising:
an electrowetting on dielectric (EWOD) device comprising an element array configured to receive a non-polar liquid and a polar liquid droplet, the element array comprising a plurality of individual array element electrodes; and
an electronic control unit configured to control actuation voltages applied to the element array to perform particle manipulation operations to concentrate particles within a portion of the polar liquid droplet by performing the method of operating an EWOD device according to claim 1.

22. The microfluidic system of claim 21, wherein one or more array element electrodes includes a conductive region that surrounds a non-conductive aperture.

23. The microfluidic system of claim 21, further comprising a sensor, wherein the electronic control unit is configured to use feedback from the sensor within the element array to determine a location of particles within the liquid droplet.

24. The microfluidic system of claim 23, wherein the electronic control unit further is configured to modifying the actuation pattern applied to element electrodes as particles are concentrated toward a particular element electrode.

25. A non-transitory computer-readable medium storing program code which is executed by a processing device for controlling operation of an electro-wetting on dielectric (EWOD) device, the program code being executable by the processing device to perform the steps of:
dispensing a non-polar liquid onto an element array of the EWOD device;
dispensing a polar liquid droplet onto the element array of the EWOD device within the non-polar liquid, wherein the polar liquid droplet includes particles; and
applying an actuation cycle comprising a plurality of actuation patterns, wherein at least one of the actuation patterns includes actuating one or more array element electrodes located within a perimeter of the polar liquid droplet, and the particles migrate within the polar liquid droplet to become concentrated within a portion of the liquid droplet at one or more array element electrodes corresponding to one of the plurality of actuation patterns;
wherein the actuation cycle comprises a plurality of frames, each of the plurality of frames including an actuation pattern of actuated and de-actuated array element electrodes located within a perimeter of the polar liquid droplet, and the plurality of frames are sequentially performed in a time sequence; and
wherein the actuation cycle further comprises performing the time sequence of the plurality of frames over multiple iterations to concentrate the particles.

* * * * *